US012570524B2

(12) United States Patent
O'Neal et al.

(10) Patent No.: US 12,570,524 B2
(45) Date of Patent: Mar. 10, 2026

(54) REVERSE FLOW REACTOR WITH INTEGRATED PARTIAL OXIDATION

(71) Applicant: EXXONMOBIL TECHNOLOGY AND ENGINEERING COMPANY, Annandale, NJ (US)

(72) Inventors: Everett J. O'Neal, Spring, TX (US); David C. Dankworth, Princeton, NJ (US); Lu Han, Ringoes, NJ (US); Sarah E. Feicht, Branchburg, NJ (US); Anastasios I. Skoulidas, Pittstown, NJ (US)

(73) Assignee: EXXONMOBIL TECHNOLOGY AND ENGINEERING COMPANY, Spring, TX (US)

( * ) Notice: Subject to any disclaimer, the term of this patent is extended or adjusted under 35 U.S.C. 154(b) by 225 days.

(21) Appl. No.: 18/499,472

(22) Filed: Nov. 1, 2023

(65) Prior Publication Data

US 2024/0140792 A1 May 2, 2024

Related U.S. Application Data

(60) Provisional application No. 63/381,951, filed on Nov. 2, 2022.

(51) Int. Cl.
| | |
|---|---|
| *C01B 3/26* | (2006.01) |
| *B01J 19/00* | (2006.01) |
| *B01J 19/24* | (2006.01) |

(52) U.S. Cl.
CPC ............. *C01B 3/26* (2013.01); *B01J 19/0066* (2013.01); *B01J 19/2485* (2013.01);
(Continued)

(58) Field of Classification Search
CPC ................ B01J 19/0066; B01J 19/2485; B01J 2208/00327; B01J 2208/00513;
(Continued)

(56) References Cited

U.S. PATENT DOCUMENTS

| | | | |
|---|---|---|---|
| 7,740,289 B2 | 6/2010 | Tang | |
| 7,740,829 B2 | 6/2010 | Becker et al. | |

(Continued)

FOREIGN PATENT DOCUMENTS

| | | |
|---|---|---|
| WO | 2017/087188 A1 | 5/2017 |
| WO | 2020/219252 A2 | 10/2020 |
| WO | 2021/040811 A1 | 3/2021 |

OTHER PUBLICATIONS

International Search Report and Written Opinion received for PCT Patent Application No. PCT/US2023/078322, mailed on Feb. 16, 2024, 12 pages.

(Continued)

*Primary Examiner* — Ellen M McAvoy
*Assistant Examiner* — Chantel Graham
(74) *Attorney, Agent, or Firm* — Shook, Hardy & Bacon L.L.P.

(57) ABSTRACT

Systems and methods are provided for performing both reforming and partial oxidation as part of the reaction step of a reaction cycle in a cyclic reaction environment such as a reverse flow reaction environment, where heat is provided by direct heating during a regeneration step. In some aspects, performing a combination of reforming and partial oxidation can allow for higher conversion of hydrocarbons than reforming alone while reducing or minimizing the peak temperatures within the cyclic reaction environment. In some aspects, performing both reforming and partial oxidation can also allow for an improved molar ratio of $H_2$ to CO in the resulting effluent from the conversion reaction (relative to partial oxidation) while still maintaining high total conversion.

20 Claims, 2 Drawing Sheets

(52) U.S. Cl.
CPC .. *C01B 2203/0238* (2013.01); *C01B 2203/06*
(2013.01); *C01B 2203/1235* (2013.01)

(58) Field of Classification Search
CPC .............. B01J 2208/00522; B01J 6/008; B01J
8/0285; B01J 8/0492; C01B 2203/0238;
C01B 2203/06; C01B 2203/1235; C01B
3/26; C01B 3/382; C01B 3/386; Y02E
60/10
See application file for complete search history.

(56) References Cited

U.S. PATENT DOCUMENTS

| | | | |
|---|---|---|---|
| 7,815,873 B2 | 10/2010 | Sankaranarayanan et al. | |
| 8,754,276 B2 | 6/2014 | Buchanan et al. | |
| 2004/0170559 A1 | 9/2004 | Hershkowitz et al. | |
| 2007/0033873 A1 | 2/2007 | D'Souza | |
| 2014/0046107 A1 | 2/2014 | Buchanan et al. | |
| 2018/0333703 A1 | 11/2018 | Ide et al. | |
| 2020/0317515 A1* | 10/2020 | O'Neal ..................... | C01B 3/46 |
| 2020/0331751 A1 | 10/2020 | O'Neal et al. | |
| 2021/0061657 A1 | 3/2021 | Skoulidas et al. | |
| 2022/0235282 A1 | 7/2022 | Weiss et al. | |

OTHER PUBLICATIONS

International Search Report and Written Opinion received for PCT
Patent Application No. PCT/US2023/078324, mailed on Feb. 19,
2024, 11 pages.

\* cited by examiner

REVERSE FLOW REACTOR WITH INTEGRATED PARTIAL OXIDATION

CROSS-REFERENCE TO RELATED APPLICATIONS AND PRIORITY CLAIM

This Non-Provisional patent application claims priority to U.S. Provisional Patent Application No. 63/381,951, filed Nov. 2, 2022, and titled "Reverse Flow Reactor With Integrated Partial Oxidation", the entire contents of which is incorporated herein by reference.

FIELD OF THE INVENTION

Methods are provided for operating reverse flow reactors to perform a combination of steam reforming and oxycombustion.

BACKGROUND OF THE INVENTION

Reverse flow reactors are an example of a reactor type that is beneficial for use in processes with cyclic reaction conditions. For example, due to the endothermic nature of reforming reactions, additional heat needs to be introduced on a consistent basis into the reforming reaction environment. Reverse flow reactors can provide an efficient way to introduce heat into the reaction environment. After a portion of the reaction cycle used for reforming or another endothermic reaction, a second portion of the reaction cycle can be used for combustion or another exothermic reaction to add heat to the reaction environment in preparation for the next reforming step. U.S. Pat. Nos. 7,815,873 and 8,754,276 provide examples of using reverse flow reactors to perform various endothermic processes in a cyclic reaction environment.

Due in part to the ability to perform direct heating of the interior surfaces of a reverse flow reactor while maintaining high purity in the resulting hydrogen product, reverse flow reactors have the potential to provide substantial advantages over conventional steam reforming configurations. However, some practical challenges remain. For example, one of the difficulties with using a reverse flow reactor for reforming is that the reaction environment is cycled rapidly at elevated temperatures. To achieve the highest reforming yields, peak temperatures of 1100° C. or more may be needed. However, exposing reforming catalysts and/or catalyst systems to such elevated temperatures as part of cyclic reaction environment can potentially result in degradation of the catalyst.

An alternative to performing catalytic reforming in a reverse flow reactor is to perform reforming via partial oxidation. Partial oxidation can be performed without a catalyst, thereby reducing some of the difficulties associated with the high temperature, cyclic environment present in a reverse flow reactor. However, the molar ratio of hydrogen to carbon monoxide when performing partial oxidation is relatively low when compared to the molar ratio of hydrogen to carbon monoxide achieved via steam reforming.

U.S. Pat. No. 7,740,289 describes production of synthesis gas in a reverse flow reactor by steam reforming followed by incomplete combustion of remaining hydrocarbons at elevated temperature and pressure. In addition to providing additional synthesis gas, the incomplete combustion provides heat to the reactor. In the method described in U.S. Pat. No. 7,740,289, the reversal of flow is achieved by alternating the end of the reactor used for input of the reactant flows for performing the steam reforming and incomplete combustion. The resulting synthesis gas can then be used for production of methanol.

U.S. Patent 2020/0331751 describes methods for hydrogen production with integrated $CO_2$ capture. Some methods include using oxycombustion during the regeneration step, so that the amount of gases other than $CO_2$ and $H_2O$ in the flue gas from regeneration is reduced or minimized.

SUMMARY OF THE INVENTION

In an aspect, a method for converting hydrocarbons in a cyclic flow reaction system is provided. The method includes mixing a fuel flow and a first $O_2$-containing flow in a mixing zone of a reactor system to form a mixture comprising an $O_2$ content of 0.1 vol % or more. The reactor system can include a reforming zone, a mixing zone adjacent to the reforming zone, and a recuperation zone adjacent to an opposing side of the mixing zone. The method further includes reacting the mixture to heat one or more surfaces in the reforming zone to a reforming temperature. At least a portion of the reforming zone can include a reforming catalyst. The method further includes exposing a reactant stream containing one or more hydrocarbons to the reforming catalyst in the reforming zone under reforming conditions to form a reforming effluent, a direction of flow of the reactant stream being reversed relative to a direction of flow for the mixture. The method further includes mixing at least a portion of the reforming effluent with a second $O_2$-containing stream in the mixing zone. Additionally, the method includes exposing the mixture of the at least a portion of the reforming effluent and the second $O_2$-containing stream to partial oxidation conditions in the recuperation zone to form a partial oxidation effluent. Optionally, the partial oxidation effluent can contain 2.0 vol % or less of hydrocarbons and/or a molar ratio of $H_2$ to CO of 2.2 or more.

In another aspect, a reverse flow reactor system is provided. The reactor system can include a reaction zone including a reforming catalyst and a heat sink, the reaction zone having an average reforming catalyst density. The reaction zone further includes a reactant inlet and a flue gas outlet. The reactor system further includes a mixing zone adjacent to the reaction zone, the reaction zone including at least one reaction zone flow path providing fluid communication between the reactant inlet and the mixing zone. The reactor system further includes a recuperation zone adjacent to the mixing zone, the mixing zone providing fluid communication between the reaction zone and the recuperation zone. The recuperation zone can include a fuel inlet, an oxidant inlet, and a reaction effluent outlet. The recuperation zone can include at least one recuperation zone flow path providing fluid communication between the fuel inlet and the mixing zone. The recuperation zone can further include one or more channels for providing fluid communication between the oxidant inlet and the mixing zone that are separate from the at least one flow path. Additionally, the reactor system can include a second oxidant inlet and at least one additional flow path providing fluid communication between the second oxidant inlet and the mixing zone, the at least one additional flow path being separate from the at least one reaction zone flow path.

DETAILED DESCRIPTION OF THE EMBODIMENTS

Figure 1:
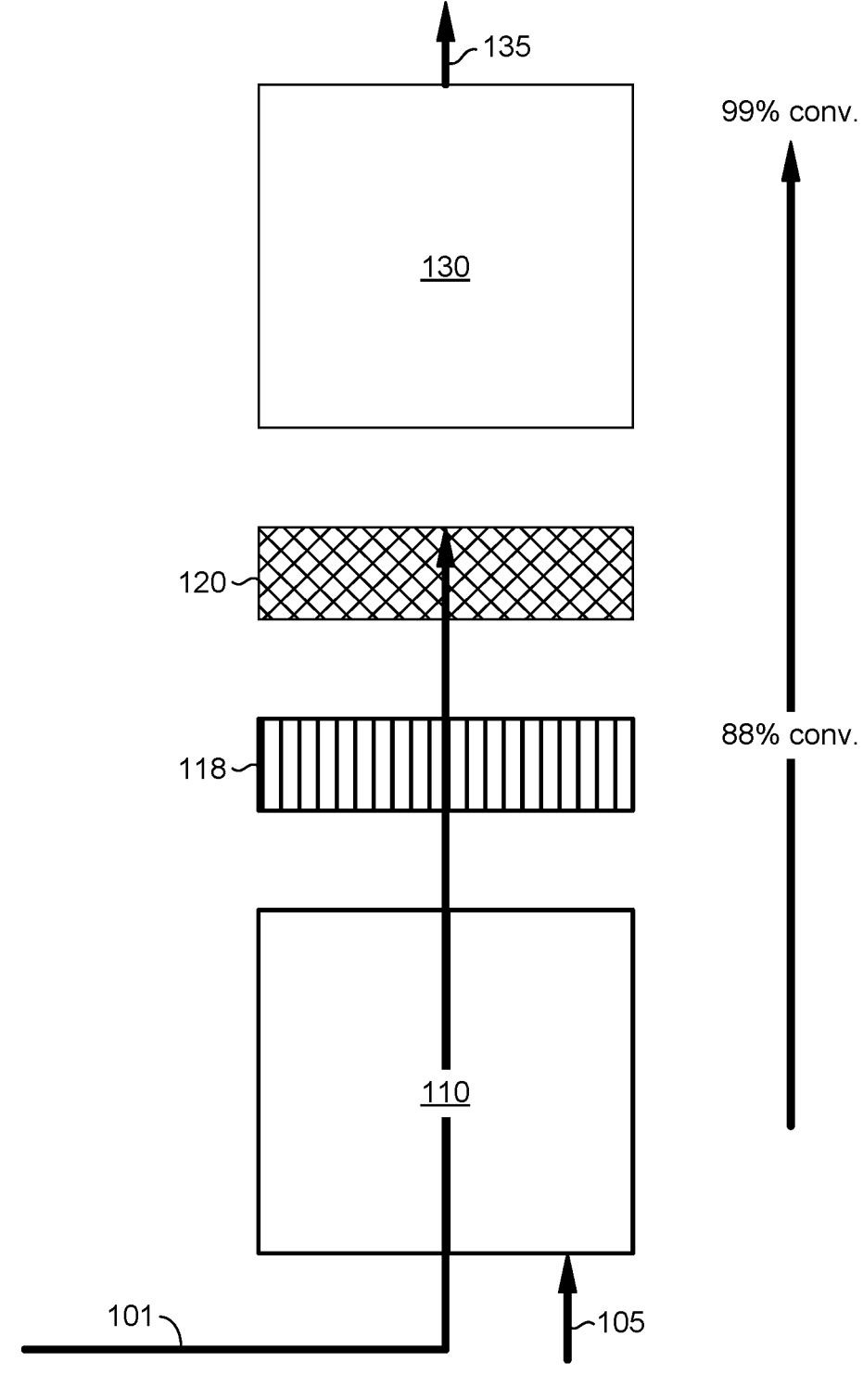
FIG. 1 shows an example of a reaction system during a reaction step.

All numerical values within the detailed description and the claims herein are modified by "about" or "approximately" the indicated value, and take into account experimental error and variations that would be expected by a person having ordinary skill in the art.

Overview

In various aspects, systems and methods are provided for performing both reforming and partial oxidation as part of the reaction step of a reaction cycle in a cyclic reaction environment such as a reverse flow reaction environment, where heat is provided by direct heating during a regeneration step. The systems and methods can provide advantages relative to both conventional reforming methods (such as steam reforming) and conventional partial oxidation methods. Generally, the systems and methods can provide improved throughput relative to performing either reforming or partial oxidation alone. Additionally, in some aspects, performing a combination of reforming and partial oxidation can allow for higher conversion of hydrocarbons than reforming alone while reducing or minimizing the peak temperatures within the cyclic reaction environment. In some aspects, performing both reforming and partial oxidation can also allow for an improved molar ratio of $H_2$ to CO in the resulting effluent from the conversion reaction (relative to partial oxidation) while still maintaining high total conversion.

One of the advantages of a reverse flow reaction environment/reactor system is that the heat for the reaction step is provided by direct heating of surfaces within the reaction environment during a regeneration step. Using direct heating (where oxidation of fuel to provide heat is performed within the reaction environment for the subsequent reaction step) can reduce or minimize losses associated with heat transfer. This is in contrast to indirect heating, where combustion of fuel is performed in a separate volume and then heat is transferred into the reaction volume, such as by transfer of heat through the walls surrounding the reaction zone or volume.

Unfortunately, using direct heating also poses challenges when attempting to perform both steam reforming and partial oxidation within the reaction environment. In particular, partial oxidation requires temperatures of 1100° C. or higher, or 1200° C. or higher, or 1300° C. or higher, such as up to 1600° C. or possibly still higher. Exposing conventional reforming catalyst to these elevated temperatures during cyclic operation has the potential to rapidly degrade the catalyst and/or the catalyst activity. An additional problem is due to the incompatibility of the respective reaction processes when performing both steam reforming and partial oxidation in the same reactor. Partial oxidation requires the presence of at least some $O_2$ within the reaction environment. However, the partial oxidation reaction is exothermic, so any portion of the steam reforming catalyst system that is exposed to the partial oxidation feed is at risk for being exposed to temperatures well above 1100° C. if partial oxidation occurs in the vicinity of the reforming catalyst. Still another difficulty is due to transport of heat within the reaction volume by the reaction effluent and/or the regeneration flue gas. Even if oxidation of hydrocarbons is avoided in the vicinity of the reforming catalyst, as the reaction effluent or flue gas flows within the reactor, additional heat is transported to other sections. This can result in the reforming catalyst being exposed to temperatures of 1100° C. or more due to the flow of heated gas from a zone where oxidation of hydrocarbons occurs to the zone where the reforming catalyst is located.

In various aspects, systems and methods are provided that overcome one or more of the above challenges to allow for performing both steam reforming and partial oxidation during the reaction step within a cyclic reaction environment that is heated by direct heating, such as a reverse flow reactor system environment. In some aspects, the mixer or mixing zone in the reactor system can be configured to allow for selective mixing of input flows during both the reaction step and the regeneration step. During the regeneration step, the mixer can provide the traditional function of delaying the mixing of oxidant with fuel, so that oxidation (such as combustion) of the fuel does not occur until the fuel is within or near to the reaction zone/reforming zone. During the reaction step, where the flows are in the opposite direction, the mixer can delay the mixing of oxidant with the reforming input flow and/or the reforming effluent, so that partial oxidation is reduced, minimized, or avoided until after the reforming effluent enters the recuperation zone.

Additionally or alternately, in some aspects, an additional thermal mass or heat sink can be included in the reaction zone/reforming zone at or near the interface with the mixing zone. During a regeneration step, the flows in the reactor are in the direction opposite to the direction of flow during a reaction step. During a reaction step, heat can accumulate in the recuperation zone due to the exothermic nature of partial oxidation. This heat is partially retained within the recuperation zone at the end of the reaction step. When the next regeneration step begins, the flow in the opposing direction could carry this excess heat from the partial oxidation into the reforming zone, potentially resulting in higher temperatures than desired. By including a heat sink or zone of high heat capacity at or near the interface between the reforming zone and the mixing zone, the transfer of heat from the recuperation zone to the reforming catalyst zone during the regeneration step can be mitigated. In addition to high heat capacity, the heat sink can optionally contain a reduced or minimized amount of reforming catalyst (such as down to containing no reforming catalyst). The presence of the heat sink can allow control to be maintained over the temperature profile, so that sufficient heat is added to the reforming zone generally while reducing, minimizing, or avoiding exposure of reforming catalyst to excessive peak temperatures.

Further additionally or alternately, the recuperation zone (where partial oxidation occurs) can be modified to mitigate the amount of heat transfer and/or the rate of heat transfer from the recuperation zone to the reforming catalyst zone during the regeneration step. Modifications can include using larger diameter channels for the gas flows in the recuperation zone, so that the amount of contact between the regeneration gas flows and the surfaces of the recuperation zone is reduced. This can avoid overheating of the regeneration gas flows prior to combustion of the fuel at or near the start of the reforming zone. Another option can be to introduce a heat transfer limitation in the recuperator by monotonically increasing the channel area from the end of the recuperation zone at the end of the reactor system (small channels) to the end of the recuperation zone that corresponds to the interface of the recuperation zone with the mixing zone (large channels). For example, in a vertical configuration where the recuperation zone is at the top of the reactor, this approach will capture heat from the partial oxidation during the reforming step in the center to top of the recuperation zone. Additionally, this type of increase in the size of the channels within the recuperation zone (i.e., where the channels increase in size as the channels approach the interface with the mixing zone) will slow the rate of heat transfer from the recuperation zone to the regeneration gas during the regeneration step, thus heating the gas more uniformly throughout the regeneration step of the process cycle. Additionally, the heat capacity can be higher at the top of the recuperator than the bottom, either through a change in open frontal area or material properties. This will store heat further from the reforming catalyst, which may reduce the impact of maldistribution and hotspots on the catalyst.

Still further additionally or alternately, the gas flows during the regeneration step can be varied over time to provide further control over the temperature profile within the various zones in the reactor system. For example, during an initial portion of the regeneration step, a higher amount of diluent can be included with the fuel flow. This can reduce the peak temperature early during the regeneration step and/or facilitate more even transfer of heat throughout the reforming catalyst (and/or reaction) zone, thus reducing the temperature increase in the portion of the reforming catalyst zone that is closest to the partial oxidation section. Another option can be to ramp the amount of fuel over time during the regeneration step. As the recuperation zone is cooled, more fuel can be added, so that the peak temperature in the reforming zone during regeneration is reduced while still providing a total amount of fuel that provides the needed heat for performing the next reaction step.

Yet other modifications can be related to operation of the reforming zone. Performing partial oxidation on the reforming effluent means that the reforming reaction does not need to convert all of the hydrocarbons in the input flow to the reforming step. Instead, converting 70 wt % to 90 wt % of the hydrocarbons during conversion can be sufficient, or 70 wt % to 85 wt %, or 75 wt % to 90 wt %, or 70 wt % to 80 wt %, or 75 wt % to 85 wt %. These lower levels of conversion can be achieved at lower reforming temperatures. Thus, the addition of partial oxidation can allow the reforming zone in the reactor system to be operated at a lower temperature, such as a peak temperature in the reforming zone of 1000° C. or less, or 900° C. or less, or 800° C. or less, such as down to a peak temperature in the reforming zone of 750° C. or possibly still lower. It is further noted that due to the hotter temperature profile in the recuperation zone, the ignition delay of the fuel flow during regeneration is reduced, which can further facilitate operating the reforming zone at lower peak temperatures.

It is noted that in some aspects, performing both steam reforming and partial oxidation can be beneficial when attempting to create a hydrogen-containing effluent that can be used as the input flow for ammonia synthesis. One of the difficulties with ammonia synthesis is that the input flows need to have relatively high purity, including a reduced or minimized content of methane and/or other hydrocarbons. By using a combination of steam reforming and partial oxidation, high conversion of methane (and/or other hydrocarbons) can be achieved while also generating an effluent with a high molar ratio of $H_2$ to CO. This can reduce or minimize the amount of additional processing that is needed to use the resulting effluent as an input flow for ammonia synthesis.

Reactor Configuration

In this discussion, a reactor system for performing both reforming and partial oxidation is defined as having three zones/reactors. One zone/reactor corresponds to the reforming zone in the reactor system. This can be referred to as the reforming zone, the reforming reactor, or the reaction zone. Another zone/reactor corresponds to the recuperation zone. This can be referred to as the recuperation zone or recuperation reactor. The third zone is the mixing zone. The three zones can be ordered in a series relationship, with the mixing zone between the reforming zone and the recuperation zone. The three zones can have at least one common flow path, with the zones optionally having a common axis. The common axis can be horizontal, vertical, or any other convenient orientation. Based on the common flow path, the mixing zone can provide fluid communication between the reforming zone and the recuperation zone.

The mixing zone of the reactor system can assist with maintaining a target temperature profile during a reaction cycle. In a reverse flow reactor system, the heat needed for an endothermic reaction may be provided by creating a high-temperature heat bubble in a middle portion of the reactor system. A two-step process can then be used wherein heat is (a) added to the reactor bed(s) or monolith(s) via in-situ combustion (or more generally, oxidation of the fuel), and then (b) removed from the bed in-situ via an endothermic process, such as reforming, pyrolysis, or steam cracking. This type of configuration can provide the ability to consistently manage and confine the high temperature bubble in a reactor region(s) that can tolerate such conditions long term. A reverse flow reactor system can allow the primary endothermic and regeneration processes to be performed in a substantially continuous manner. In some aspects, the mixing zone is defined as a zone of the reactor system that does not contain reforming catalyst.

During regeneration, at least one of the fuel flow and oxidant flow is introduced into the reactor system at or near the end of the reactor system corresponding to the recuperation zone. This allows the fuel and/or oxidant flow to be heated by heat stored in the recuperation zone. In order to delay the location of combustion of fuel until the fuel is at or near the location of reforming zone, the fuel flow and oxidant flow can be introduced into the reactor via separate channels. For example, the fuel flow can be introduced into the primary volume and/or primary flow channels, while a separate set of channels can be used to introduce the oxidant flow, such as air or another $O_2$-containing gas. By delaying the mixing of the fuel and oxidant, the location of combustion can be controlled, so that heat is delivered primarily to the portion of the reactor system is located. This allows a high temperature zone or heat bubble to form in the middle of the reactor system. The heat bubble can correspond to a temperature that is at least about the initial temperature for the endothermic reaction. Typically, the temperature of the heat bubble can be greater than the initial temperature for the endothermic reaction, as the temperature will decrease as heat is transferred from the heat bubble in a middle portion of the reactor toward the ends of the reactor. The combustion process can take place over a long enough duration that the flow of fuel/oxidant/resulting flue gas also serves to displace a substantial portion of the heat produced by the reaction (e.g., the heat bubble), into and at least partially through the reforming zone, but preferably not all of the way through the reforming zone to avoid waste of heat. The flue gas may be exhausted through the end of the reactor corresponding to the reforming zone, but preferably most of the heat is retained within the reforming zone. The amount of heat displaced into the reforming zone during the regeneration step can also be limited or determined by the desired exposure time or space velocity that the hydrocarbon feed gas will have during the subsequent reaction step (reforming plus partial oxidation).

After the regeneration or heating step, in the next/reverse step of the cycle, reactants for the reforming reaction can be supplied or flowed through the reforming zone from the direction opposite the direction of flow during the heating step. For example, in a reforming process, methane (and/or natural gas and/or another hydrocarbon) can be supplied or flowed through the reforming zone. The methane can contact the heated surfaces in the reforming zone and/or the mixing zone, in the heat bubble region, to transfer the heat to the methane for reaction energy. This provides at least a portion of the heat for performing the reforming reaction.

Although delaying combustion of fuel during the regeneration step can allow a heat bubble to form in the middle of the reactor, using separate flow channels to deliver the oxidant to roughly the desired location for the combustion reaction means that the fuel and oxidant are not well-mixed prior to entering the reactor system. In order to reduce or minimize variations in the temperature profile across the cross-section of a reactor, mixing elements can be used to assist with mixing the fuel flow and oxidant flow.

In aspects where both reforming and partial oxidation are performed during the reaction step, various modifications to the reforming and regeneration processes can be beneficial. This is due in part to the changes that are caused by performing additional partial oxidation during the reforming step.

Some modifications can be related to providing control over where partial oxidation occurs during the reforming step. As noted above, during the regeneration step, the mixing zone is used to facilitate mixing of fuel and oxidant, in order to improve the temperature distribution across the cross-section of the reactor system. In various aspects, mixing elements can be provided so that the mixing zone is also used to delay addition of oxidant during the reforming step. In a traditional reforming step, substantially no oxidant would be added to the reforming step, in order to avoid combustion of fuel in the presence of the reforming catalyst. By contrast, in various aspects, both partial oxidation and reforming can be performed by using separate channels to add air or another $O_2$-containing gas to the effluent from the reforming reaction. This separately added oxidant can be mixed with the reforming effluent in at least a portion of the mixing zone, thus allowing the partial oxidation reaction to occur in the mixing zone and/or the recuperation zone. It is noted that oxidant flows can be added to a mixing zone at any convenient location. Thus, during either the regeneration step or the reforming step, oxidant can be added at or near the beginning of the mixing zone, or at a middle portion of the mixing zone, or near the end of the mixing zone. It is noted that the location for addition of oxidant during the regeneration step may not be related to/symmetric with the location for addition of oxidant during the reforming step.

By adding the $O_2$-containing gas downstream from where reforming occurs, at least a substantial portion of the reforming occurs in the presence of substantially no $O_2$ content, such as an $O_2$ content of 0.01 vol % or less. In such aspects, at least a portion of the reforming catalyst is exposed to an $O_2$ content of 0.01 vol % or less.

The oxidant used for the partial oxidation can be dependent in part on the desired use for the resulting effluent. In some aspects the oxidant for partial oxidation can correspond to $O_2$ from an air separation unit. This can be beneficial, for example, in aspects where the $H_2$ in the reaction effluent is intended for use as a fuel or as a high purity $H_2$ reactant stream. Optionally, such $O_2$ can be diluted with $CO_2$ and/or $H_2O$ to improve the heat transport properties of the gas flow. As an example, an $O_2$-containing stream can include a combined amount of $CO_2$ and $O_2$ that corresponds to 50 vol % or more of the stream, such as up to the stream comprising substantially only $CO_2$ and $O_2$. In such an aspect, the $N_2$ content of the stream can be 25 vol % or less, such as down to having substantially no $N_2$ content. As another example, in some aspects air can be used as the oxidant source. This reduces or minimizes the need for an air separation unit to provide higher purity oxygen. This type of configuration can be beneficial, for example, in aspects where the intended use of the reaction effluent is as an input reactant stream for ammonia production. In still other aspects, a mixture of air and higher purity $O_2$ can be used as the oxidant, so that the $O_2$ content of the oxygen stream is set to any convenient or desired level. In various aspects, the $O_2$ content of the oxidant stream for the partial oxidation step can range from 20 vol % to 100 vol %, or 20 vol % to 80 vol %, or 20 vol % to 60 vol %, or 20 vol % to 40 vol %, or 40 vol % to 100 vol %, or 60 vol % to 100 vol %, or 80 vol % to 100 vol %.

It is noted that the oxidant for partial oxidation does not necessarily need to be heated prior to introduction into the reaction system. Because the oxidant for the partial oxidation typically represents a relatively small percentage of the total gas flow volume, in some aspects the oxidant flow for the partial oxidation reaction can be introduced into the reactor at or near the mixing zone. In other aspects, the oxidant flow for the partial oxidation reaction can be introduced into the reforming zone in separate channels, and then mixed with the effluent from reforming within the mixing zone.

Other modifications can be related to managing the temperature profile within the reactor system. For example, when both reforming and partial oxidation are performed during the reaction step, the partial oxidation occurs within the recuperation reactor or zone of the reactor system. Because partial oxidation is an exothermic process, this adds additional heat to the recuperation zone, beyond the heat that would be stored in the recuperation zone simply due to heat transfer from a reforming effluent that is exiting from the reactor system. This additional heat can substantially raise the temperature in portions of the recuperation zone. As noted above, the recuperation zone is used to heat the fuel flow and/or the oxidant flow during the regeneration step. Because the partial oxidation reaction adds more heat/ increases the temperature in the recuperation zone during the reforming step, the fuel flow and/or oxidant flow during the regeneration step can potentially be heated to a higher temperature than desirable. This could potentially result in peak temperatures during regeneration within the reforming zone that can lead to more rapid degradation of catalyst and/or catalyst activity.

Because of the additional heat added to the recuperation zone during partial oxidation, another modification can be to modify the reforming zone by adding a heat sink (i.e., a high thermal mass structure) to the reforming zone. The heat sink can be included in the reforming zone at or near the interface with the mixing zone. Although the heat sink is part of the reforming zone, the amount of reforming catalyst in the heat sink can optionally be reduced or minimized. For example, relative to the average density of reforming catalyst across the entire reforming zone, the average density of reforming catalyst in the heat sink can be 10% or less, or 5.0% or less, such as down to have substantially no density of reforming catalyst. Optionally, the heat sink can include no reforming catalyst. By reducing or minimizing the amount of catalyst present in the heat sink, changes in activity due to degradation of catalyst in the heat sink can be minimized.

Providing a heat sink (i.e., reactor elements having a high thermal mass) at the interface between the mixing zone and the reforming zone can provide several advantages when performing both reforming and partial oxidation during the reaction step. First, the heat sink can provide a portion of the reforming zone that can be exposed to a higher peak temperature with a reduced concern about degradation of catalyst. Thus, during the regeneration step, the heat sink can adsorb excess heat transferred from the recuperation zone to the reforming zone. This can smooth out temperature spikes at the beginning of the regeneration step if higher than expected temperatures are present in the recuperation zone. Second, during the reforming step, the heat sink provides a thermal mass that can assist with pre-heating the reforming effluent after exposure to the reforming catalyst is substantially complete. This can assist with increasing the temperature of the reforming effluent to temperatures where partial oxidation can be driven closer to completion prior to mixing the reforming effluent with oxidant.

It is noted that the combination of performing partial oxidation during the reforming step and the addition of the heat sink to the reforming zone can potentially change the overall shape of the temperature profile within the reactor system. When only reforming is performed during the reaction step, the temperature profile of the reactor system corresponds to a temperature peak somewhere near the middle of the reactor, such as at or near the interface between the reforming zone and the mixing zone. The temperature declines toward both ends of the reactor. However, due to the heat added during partial oxidation, the temperature peak can potentially move away from the interface between the mixing zone and the reforming zone. Additionally or alternately, a dual-peak temperature profile may be present, with one peak at a location where the oxidation (combustion) reaction begins during regeneration, and a second peak where partial oxidation begins during the reaction step. In some aspects, the temperature peak that is closer to the reforming zone can be a lower temperature than the temperature peak that is farther from the reforming zone.

FIG. 1 shows an example of a reactor system configuration for performing both reforming and partial oxidation during the reforming step in a reverse flow reactor. In FIG. 1, the reactor system is shown during a reforming step. In FIG. 1, a feed flow 105 containing reformable hydrocarbons (such as methane) is passed into reforming zone 110, where the feed flow is exposed to reforming conditions. This reduces the temperature of reforming zone 110 as the reforming reaction occurs, due to the endothermic nature of the reaction. The effluent from reforming is then passed through heat sink 118. The heat sink 118 includes a reduced or minimized amount of catalyst, so the heat sink is not directly cooled by reforming to a significant degree. As a result, the heat sink remains at a higher temperature so that the heat sink can assist with heating the effluent from reforming prior to the reforming effluent entering mixing zone 120. It is noted that heat sink 118 is part of reforming zone 110, even though the heat sink 118 may contain no reforming catalyst. An $O_2$-containing flow 101 is then mixed with the reforming effluent in mixing zone 120. In the example shown in FIG. 1, the $O_2$-containing flow 101 is delivered to mixing zone 120 via separate channels from the flow path used for feed flow 105. The mixing of $O_2$-containing flow 101 with the reforming effluent starts the partial oxidation reaction, which continues in recuperation zone 130. The partial oxidation reaction results in heating of the recuperation zone 130. Due to the equilibrium nature of the reforming reaction, roughly 80 wt % conversion of hydrocarbons can be readily achieved in the presence of reforming catalyst, while up to 90 wt % conversion (or possibly still somewhat higher) can be achieved with optimized process conditions. Such conditions can include, for example, peak temperatures within the reforming zone of 1100° C. or higher during the reforming process. However, increasing conversion of hydrocarbons above 95 wt % just by reforming is difficult unless a separation is somehow integrated with the reforming process to shift the equilibrium. By contrast, adding $O_2$-containing flow 101 in mixing zone 120 can allow for conversions of up to 99 wt % or possibly still higher by using partial oxidation to convert the remaining hydrocarbons that are present after reforming. The high conversion of hydrocarbons results in an effluent 135 with a reduced or minimized content of hydrocarbons.

Figure 2:
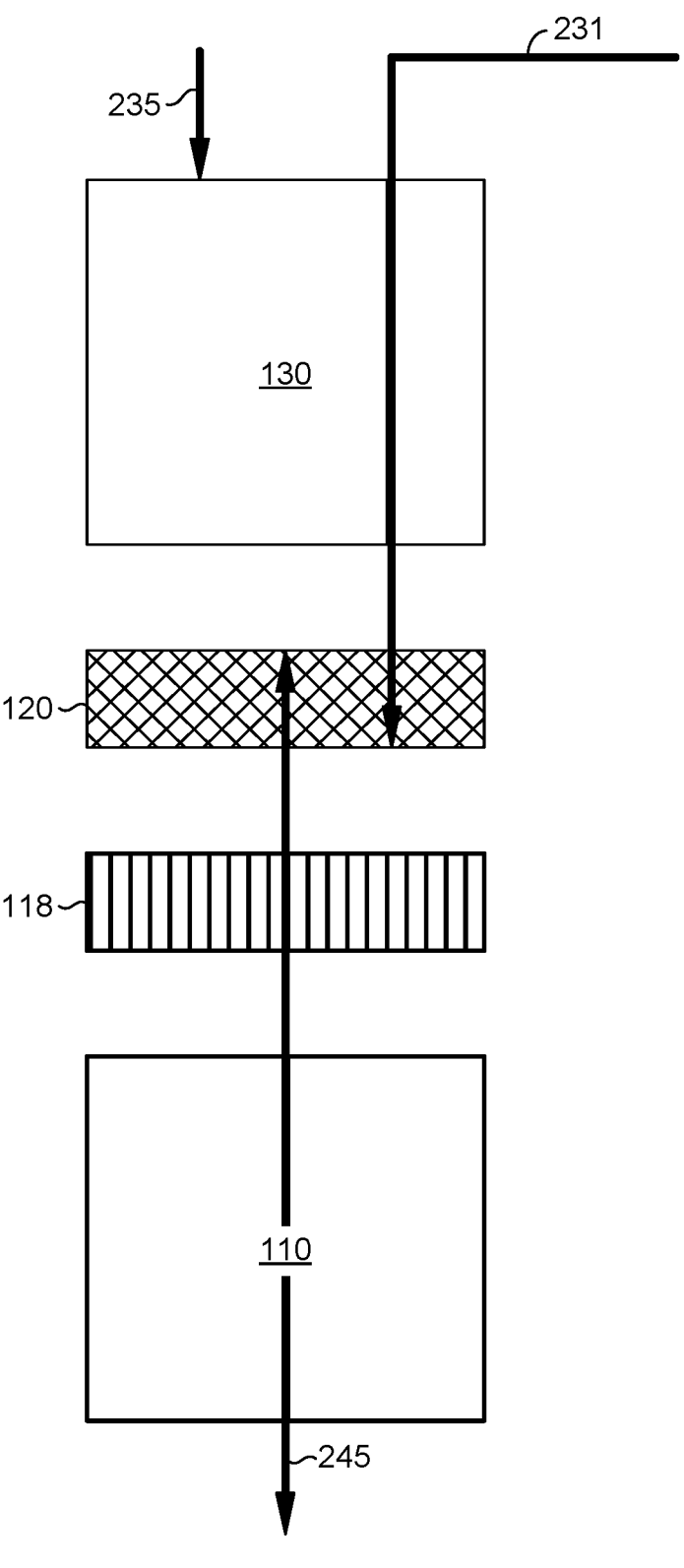
FIG. 2 shows an example of the reaction system during a regeneration step.

FIG. 2 shows a reaction system similar to FIG. 1, but during the regeneration step. In the example shown in FIG. 2, fuel flow 235 is introduced into recuperation zone 130. An oxidant flow 231 (such as air or another $O_2$-containing gas) is passed into the mixing zone 120 using separate channels from the flow path for fuel flow 235. Thus, in the example shown in FIG. 2, oxidant flow 231 is not in fluid communication with the flow path for fuel flow 235 until the oxidant flow and fuel flow reach the mixing zone. At least one of fuel flow 235 and oxidant flow 231 is heated by the recuperation zone prior to entering mixing zone 120. The mixing of fuel flow 235 and oxidant flow 231 causes partial oxidation and/or combustion of the fuel flow 235, resulting in generation of heat and a flue gas. The heat is carried through reforming zone 110 (including heat sink 118) by resulting flue gas. This transfers heat to the internal surfaces of reforming zone 110, thus provided the heat needed for the subsequent reforming step. The flue gas exits 245 from the reforming zone end of the reactor system.

It is noted that the oxidant flow for the regeneration step (such as oxidant flow 231) can have any convenient content of $O_2$. In some aspects, using a higher purity $O_2$ content flow as the oxidant flow for regeneration can facilitate performing carbon capture on the flue gas from regeneration. In such aspects, an air separation unit can be used to generate at least a portion of the oxidant flow for regeneration. Optionally, in such aspects, $CO_2$ and/or $H_2O$ can be added to the oxidant flow to improve the heat transfer properties of the oxidant flow. In other aspects, air can be used as the oxidant flow, to avoid the need for performing a separation to form the oxidant flow. In still other aspects, a mixture of air and higher purity $O_2$ can be used. In various aspects, the $O_2$ content of the oxidant stream for the regeneration step can range from 20 vol % to 100 vol %, or 20 vol % to 80 vol %, or 20 vol % to 60 vol %, or 20 vol % to 40 vol %, or 40 vol % to 100 vol %, or 60 vol % to 100 vol %, or 80 vol % to 100 vol %. In aspects where air is not used and/or where $O_2$ from an air separation unit is used as part of the oxidant flow for regeneration, $O_2$ can be diluted with $CO_2$ and/or $H_2O$ to improve the heat transport properties of the gas flow. As an example, an $O_2$-containing stream can include a combined amount of $CO_2$ and $O_2$ that corresponds to 50 vol % or more of the stream, such as up to the stream comprising substantially only $CO_2$ and $O_2$. In such an aspect, the $N_2$ content of the stream can be 25 vol % or less, such as down to having substantially no $N_2$ content.

Both the reforming zone 110 and the recuperation zone 130 can contain regenerative monoliths and/or other regenerative structures. Regenerative monoliths or other regenerative structures, as used herein, comprise materials that are effective in storing and transferring heat as well as being effective for carrying out a chemical reaction. The regenerative monoliths and/or other structures can correspond to any convenient type of material that is suitable for storing heat, transferring heat, and catalyzing a reaction. Examples of structures can include bedding or packing material, ceramic beads or spheres, ceramic honeycomb materials, ceramic tubes, extruded monoliths, and the like, provided they are competent to maintain integrity, functionality, and withstand long term exposure to temperatures in excess of 1200° C., or in excess of 1400° C., or in excess of 1600° C., which can allow for some operating margin.

In some aspects, the recuperator can be comprised of one or more extruded honeycomb monoliths, as described above. Each monolith may provide flow channel(s) (e.g., flow paths) for one of the first or second reactants. Each channel preferably includes a plurality of conduits. Alternatively, a monolith may comprise one or more channels for each reactant with one or more channels or groups of conduits dedicated to flowing one or more streams of a reactant, while the remaining portion of conduits flow one or more streams of the other reactant. It is recognized that at the interface between channels, a number of conduits may convey a mixture of first and second reactant, but this number of conduits is proportionately small.

Alternative embodiments may use reactor media other than monoliths, such as whereby the channel conduits/flow paths may include a more tortuous pathways (e.g. convoluted, complex, winding and/or twisted but not linear or tubular), including but not limited to labyrinthine, variegated flow paths, conduits, tubes, slots, and/or a pore structure having channels through a portion(s) of the reactor and may include barrier portion, such as along an outer surface of a segment or within sub-segments, having substantially no effective permeability to gases, and/or other means suitable for preventing cross flow between the reactant gases and maintaining the first and second reactant gases substantially separated from each other while axially transiting the recuperation zone. Such other types of reactor media can be suitable, so long as at least a portion of such media can be formed by sintering a ceramic catalytic composition as described herein, followed by exposing such media to reducing conditions to activate the catalyst. For such embodiments, the complex flow path may create a lengthened effective flow path, increased surface area, and improved heat transfer. Such design may be preferred for reactor embodiments having a relatively short axial length through the reactor. Axially longer reactor lengths may experience increased pressure drops through the reactor. However for such embodiments, the porous and/or permeable media may include, for example, at least one of a packed bed, an arrangement of tiles, a permeable solid media, a substantially honeycomb-type structure, a fibrous arrangement, and a mesh-type lattice structure.

In some aspects, the regenerative bed(s) and/or monolith(s) of the recuperation zone can comprise channels having a gas or fluid barrier that isolates the first reactant channels (e.g., containing fuel) from the second reactant channels (e.g., containing oxidant). Thereby, both of the at least two reactant gases that transit the channel means may fully transit the regenerative bed(s), to quench the regenerative bed, absorb heat into the reactant gases, before combining to react with each other in the mixing zone.

By keeping the fuel and oxidant substantially separated, the location of the heat release that occurs due to exothermic reaction can be controlled. In some aspects "substantially separated" can be defined to mean that at least 50 percent, or at least 75 percent, or at least 90 percent of the reactant having the smallest or limiting stoichiometrically reactable amount of reactant, as between the first and second reactant streams, has not become consumed by reaction by the point at which these gases have completed their axial transit of the recuperator 27. In this manner, the majority of the first reactant 30 can be kept isolated from the majority of the second reactant 32, and the majority of the heat release from the reaction of combining reactants 30 and 32 can take place after the reactants begin exiting the recuperator 27. The reactants can be gases, but optionally some reactants may comprise a liquid, mixture, or vapor phase.

The percent reaction for these regeneration streams is meant the percent of reaction that is possible based on the stoichiometry of the overall feed. For example, if gas 30 comprised 100 volumes of air (80 volumes $N_2$ and 20 Volumes $O_2$), and gas 32 comprised 10 volumes of hydrogen, then the maximum stoichiometric reaction would be the combustion of 10 volumes of hydrogen ($H_2$) with 5 volumes of oxygen ($O_2$) to make 10 volumes of $H_2O$. In this case, if 10 volumes of hydrogen were actually combusted in the recuperator zone (27), this would represent 100% reaction of the regeneration stream. This is despite the presence of residual un-reacted oxygen, because in this example the un-reacted oxygen was present in amounts above the stoichiometric requirement. Thus, in this example the hydrogen is the stoichiometrically limiting component. Using this definition, less than 50% reaction, or less than 25% reaction, or less than 10% reaction of the regeneration streams can occur during the axial transit of the recuperation zone.

In various aspects, channels can comprise ceramic (including zirconia), alumina, or other refractory material capable of withstanding temperatures exceeding 1200° C., or 1400° C., or 1600° C. Additionally or alternately, channels can have a wetted area between 50 $ft^{-1}$ and 3000 $ft^{-1}$, or between 100 $ft^{-1}$ and 2500 $ft^{-1}$, or between 200 $ft^{-1}$ and 2000 $ft^{-1}$.

Process Example—Reverse Flow Reforming and Regeneration

In various aspects, the conversion of hydrocarbons during the reaction step of the cycle can be improved by performing a combination of reforming and partial oxidation.

The reforming reaction performed within the reactor can correspond reforming of methane and/or other hydrocarbons using steam reforming, in the presence of $H_2O$; using dry reforming, in the presence of $CO_2$, or using "bi" reforming in the presence of both $H_2O$ and $CO_2$. Examples of stoichiometry for steam, dry, and "bi" reforming of methane are shown in equations (1)-(3).

$$\text{Dry Reforming: } CH_4 + CO_2 = 2CO + 2H_2 \tag{1}$$

$$\text{Steam Reforming: } CH_4 + H_2O = CO + 3H_2 \tag{2}$$

$$\text{Bi Reforming: } 3CH_4 + 2H_2O + CO_2 = 4CO + 8H_2. \tag{3}$$

As shown in equations (1)-(3), dry reforming can produce lower ratios of $H_2$ to CO than steam reforming. Reforming reactions performed with only steam can generally produce a ratio of $H_2$ to CO of around 3, such as 2.5 to 3.5. By contrast, reforming reactions performed in the presence of $CO_2$ can generate much lower ratios, possibly approaching a ratio of $H_2$ to CO of roughly 1.0 or even lower. By using a combination of $CO_2$ and $H_2O$ during reforming, the reforming reaction can potentially be controlled to generate a wide variety of $H_2$ to CO ratios in a resulting syngas.

It is noted that the ratio of $H_2$ to CO in a synthesis gas can also be dependent on the water gas shift equilibrium. Although the above stoichiometry shows ratios of roughly 1 or roughly 3 for dry reforming and steam reforming, respectively, the equilibrium amounts of $H_2$ and CO in a synthesis gas can be different from the reaction stoichiometry. The equilibrium amounts can be determined based on the water gas shift equilibrium, which relates the concentrations of $H_2$, CO, $CO_2$ and $H_2O$ based on the reaction $$H_2O+CO<=>H_2+CO_2 \qquad (4)$$

Most reforming catalysts, such as rhodium and/or nickel, can also serve as water gas shift catalysts. Thus, if reaction environment for producing $H_2$ and CO also includes $H_2O$ and/or $CO_2$, the initial stoichiometry from the reforming reaction may be altered based on the water gas shift equilibrium. This equilibrium is also temperature dependent, with higher temperatures favoring production of CO and $H_2O$. It is noted that higher temperatures can also improve the rate for reaching equilibrium. As a result, the ability to perform a reforming reaction at elevated temperatures can potentially provide several benefits. For example, instead of performing steam reforming in an environment with excess $H_2O$, $CO_2$ can be added to the reaction environment. This can allow for both a reduction in the ratio of $H_2$ to CO produced based on the dry reforming stoichiometry as well as a reduction in the ratio of $H_2$ to CO produced based on the water gas shift equilibrium. Alternatively, if a higher $H_2$ to CO ratio is desired, $CO_2$ can be removed from the environ-ment, and the ratio of $H_2O$ to $CH_4$ (or other hydrocarbons) can be controlled to produce a desirable type of synthesis gas. This can potentially allow for generation of a synthesis gas having a $H_2$ to CO ratio of 0.1 to 15, or 0.1 to 3.0, or 0.5 to 5.0, or 1.0 to 10, by selecting appropriate amounts of feed components.

The reforming reactions shown in equations (1)-(3) are endothermic reactions. One of the challenges in commercial scale reforming can be providing the heat for performing the reforming reaction in an efficient manner while reducing or minimizing introduction of additional components into the desired synthesis gas product. Cyclic reaction systems, such as reverse flow reactor systems, can provide heat in a desirable manner by having a cycle including a reforming step and a regeneration step. During the regeneration step, combustion can be performed within a selected area of the reactor. A gas flow during regeneration can assist with transferring this heat from the combustion zone toward additional portions of the reforming zone in the reactor. The reforming step within the cycle can be a separate step, so that incorporation of products from combustion into the reactants and/or products from reforming can be reduced or mini-mized. The reforming step can consume heat, which can reduce the temperature of the reforming zone. As the prod-ucts from reforming pass through the reactor, the reforming products can pass through a second zone that lacks a reforming or water gas shift catalyst. This can allow the reaction products to cool prior to exiting the reactor. The heat transferred from the reforming products to the reactor can then be used to increase the temperature of the reactants for the next combustion or regeneration step.

One common source for methane is natural gas. In some applications, natural gas, including associated hydrocarbon and impurity gases, may be used as a feed for the reforming reaction. The supplied natural gas also may be sweetened and/or dehydrated natural gas. Natural gas commonly includes various concentrations of associated gases, such as ethane and other alkanes, preferably in lesser concentrations than methane. The supplied natural gas may include impu-rities, such as $H_2S$ and nitrogen. More generally, the hydro-carbon feed for reforming can include any convenient com-bination of methane and/or other hydrocarbons. Optionally, the reforming feed may also include some hydrocarbona-ceous compounds, such as alcohols or mercaptans, which are similar to hydrocarbons but include one or more het-eroatoms different from carbon and hydrogen. In some aspects, an additional component present in the feed can correspond to impurities such as sulfur that can adsorb to the catalytic monolith during a reducing cycle (such as a reform-ing cycle). Such impurities can be oxidized in a subsequent cycle to form sulfur oxides, which can then be reduced to release additional sulfur-containing components (or other impurity-containing components) into the reaction environ-ment.

In some aspects, the feed for reforming can include, relative to a total weight of hydrocarbons in the feed for reforming, 5 wt % or more of $C_{2+}$ compounds, such as ethane or propane, or 10 wt % or more, or 15 wt % or more, or 20 wt % or more, such as up to 50 wt % or possibly still higher. It is noted that nitrogen and/or other gases that are non-reactive in a combustion environment, such as $H_2O$ and $CO_2$, may also be present in the feed for reforming. In aspects where the reformer corresponds to an on-board reforming environment, such non-reactive products can optionally be introduced into the feed, for example, based on recycle of an exhaust gas into the reformer. Additionally or alternately, the feed for reforming can include 40 wt % or more methane, or 60 wt % or more, or 80 wt % or more, or 95 wt % or more, such as having a feed that is substantially composed of methane (98 wt % or more). In aspects where the reforming corresponds to steam reforming, a molar ratio of steam molecules to carbon atoms in the feed can be 0.3 to 4.0. It is noted that methane has 1 carbon atom per molecule while ethane has 2 carbon atoms per molecule. In aspects where the reforming corresponds to dry reforming, a molar ratio of $CO_2$ molecules to carbon atoms in the feed can be 0.05 to 3.0.

Within the reforming zone of a reverse flow reactor, the temperature can vary across the zone due to the nature of how heat is added to the reactor and/or due to the kinetics of the reforming reaction. The highest temperature portion of the zone can typically be found near a middle portion of the reactor. This middle portion can be referred to as a mixing zone where combustion is initiated during regeneration. At least a portion of the mixing zone can correspond to part of the reforming zone if a monolith with reforming catalyst extends into the mixing zone. As a result, the location where combustion is started during regeneration can typically be near to the end of the reforming zone within the reactor. Moving from the center of the reactor to the ends of the reactor, the temperature can decrease. As a result, the temperature at the beginning of the reforming zone (at the end of the reactor) can be cooler than the temperature at the end of the reforming zone (in the middle portion of the reactor).

As the reforming reaction occurs, the temperature within the reforming zone can be reduced. The rate of reduction in temperature can be related to the kinetic factors of the amount of available hydrocarbons for reforming and/or the temperature at a given location within the reforming zone. As the reforming feed moves through the reforming zone, the reactants in the feed can be consumed, which can reduce the amount of reforming that occurs at downstream loca-tions. However, the increase in the temperature of the reforming zone as the reactants move across the reforming zone can lead to an increased reaction rate.

In some aspects, the reforming reactions in the reforming zone can allow for conversion of 60 wt % or more of the hydrocarbons in the feed, or 70 wt % or more, or 80 wt % or more, such as up to 90 wt % or possibly still higher. Thus, the reforming effluent can still retain a substantial portion of hydrocarbons. Partial oxidation can then be performed on the hydrocarbons in the reforming effluent. This can allow the net conversion for the combination of reforming plus partial oxidation to be still higher. In some aspects, the net conversion for the combination of reforming plus partial oxidation can be 95 wt % or more of the hydrocarbons in the initial feed to the reaction step, or 98 wt % or more, or 99 wt % or more, such as up to substantially complete conversion of hydrocarbons (0.1 wt % or less that are not converted). In such aspects where partial oxidation is used to achieve elevated levels of hydrocarbon conversion, the hydrocarbon content in the effluent exiting from the reactor system can be reduced. In such aspects, the hydrocarbon content of the effluent exiting from the reactor system (after partial oxidation) can be 2.0 vol % or less, or 1.0 vol % or less, or 0.5 vol % or less, such as down to having substantially no hydrocarbon content (0.02 vol % or less). Hydrocarbon content in a reaction effluent can be determined by analyzing a sample of the effluent using gas chromatography. ASTM D1946 provides a test method for characterization via gas chromatography on a dry basis.

Partial oxidation corresponds to oxidation of a hydrocarbon under conditions where the amount of available $O_2$ is less than the stoichiometric amount required for combustion. When a stoichiometric amount of $O_2$ is available, combustion of a hydrocarbon results in complete conversion of the hydrocarbon into $CO_2$ and $H_2O$. For example, equation (5) shows the stoichiometric combustion of methane.

$$CH_4 + 2O_2 => CO_2 + 2H_2O \qquad (5)$$

However, when a sub-stoichiometric amount of $O_2$ is available, a mixture of products is formed. The mixture of products from partial oxidation can include $CO_2$, CO, $H_2$, and $H_2O$. The relative amounts of each product can vary depending on the temperature and the quantity of $O_2$ that is available relative to the stoichiometric amount.

When attempting to convert substantially all of the hydrocarbons in an input flow via partial oxidation, it can be desirable to provide a sufficient amount of $O_2$. In some aspects, the amount of $O_2$ added into the reactor system can be characterized based on the amount of hydrocarbons in the feed flow during the reaction step. This characterization can be made based on the amount of $O_2$ that would be required for stoichiometric combustion of all hydrocarbons in the feed flow. Since a substantial portion of the hydrocarbons undergo reforming, only a small portion of the total stoichiometric need is required in order to achieve substantially complete combustion of the hydrocarbons remaining after reforming. In some aspects, the amount of $O_2$ added to the reactor system can correspond to 5.0% to 30% of the stoichiometric need for full combustion of the hydrocarbons in the feed during the reaction step, or 5.0% to 20%, or 5.0% to 15%, or 10% to 30%, or 10% to 20%.

It is noted that the molar ratio of $H_2$ to CO in the products from partial oxidation tends to be lower than the molar ratio of $H_2$ to CO from reforming. By converting the majority of the hydrocarbons in the feed via reforming, while using partial oxidation to achieve substantially complete conversion, a favorable molar ratio of $H_2$ to CO can be achieved while still reducing or minimizing the content of hydrocarbons in the effluent from the reactor. In various aspects the effluent exiting the reactor during the reforming step can have a molar ratio of $H_2$ to CO of 2.0 or more, or 2.2 or more, or 2.4 or more, such as up to 2.7 or possibly still higher.

At roughly 500° C., the reaction rate for reforming can be sufficiently reduced that little or no additional reforming will occur. As a result, in some aspects as the reforming reaction progresses, the beginning portion of the reforming zone can cool sufficiently to effectively stop the reforming reaction within a portion of the reforming zone. This can move the location within the reactor where reforming begins to a location that is further downstream relative to the beginning of the reforming zone. When a sufficient portion of the reforming zone has a temperature below 500° C., or below 600° C., the reforming step within the reaction cycle can be stopped to allow for regeneration. Alternatively, based on the amount of heat introduced into the reactor during regeneration, the reforming portion of the reaction cycle can be stopped based on an amount of reaction time, so that the amount of heat consumed during reforming (plus heat lost to the environment) is roughly in balance with the amount of heat added during regeneration. After the reforming process is stopped, any remaining synthesis gas product still in the reactor can optionally be recovered prior to starting the regeneration step of the reaction cycle.

The regeneration process can then be initiated. During regeneration, a fuel such as methane, natural gas, or $H_2$, and oxygen can be introduced into the reactor and combusted. The location where the fuel and oxidant are allowed to mix can be controlled in any convenient manner, such as by introducing the fuel and oxidant via separate channels. By delaying combustion during regeneration until the reactants reach a central portion of the reactor, the non-reforming end of the reactor can be maintained at a cooler temperature. This can also result in a temperature peak in a middle portion of the reactor. Optionally, at least one temperature peak can occur within the reforming zone. Optionally, such a temperature peak can occur within the heat sink portion of the reforming zone. During a regeneration cycle, the temperature within the reforming zone can be increased sufficiently to allow for the reforming during the reforming portion of the cycle. This can result in a peak temperature within the reforming zone of 1100° C. or more, or 1200° C. or more, or 1300° C. or more, or potentially a still higher temperature.

In some aspects, the conditions for regeneration can be selected so that the peak temperature that a reforming catalyst is exposed to is lower than the peak temperature in the reforming zone. For example, the peak temperature that reforming catalyst is exposed to can be lower than the peak temperature in the reforming zone by 50° C. or more, or 100° C. or more, such as up to 250° C. or possibly still more. In some aspects, the peak temperature that reforming catalyst is exposed to can be 1000° C. or less, or 950° C. or less, or 900° C. or less, or 850° C. or less, such as down to 750° C. or possibly still lower. In some aspects, the peak temperature that reforming catalyst is exposed to can be between 600° C. to 1200° C., or 850° C. to 1000° C., or 900° C. to 1000° C., or 800° C. to 950° C., or 850° C. to 950° C., or 800° C. to 900° C.

The relative length of time and reactant flow rates for the reforming and regeneration portions of the process cycle can be selected to balance the heat provided during regeneration with the heat consumed during reforming. For example, one option can be to select a reforming step that has a similar length to the regeneration step. Based on the flow rate of hydrocarbons, $H_2O$, and/or $CO_2$ during the reforming step, an endothermic heat demand for the reforming reaction can be determined. This heat demand can then be used to calculate a flow rate for combustion reactants during the regeneration step. Of course, in other aspects the balance of heat between reforming and regeneration can be determined in other manners, such as by determining desired flow rates for the reactants and then selecting cycle lengths so that the heat provided by regeneration balances with the heat consumed during reforming.

In addition to providing heat, the reactor regeneration step during a reaction cycle can also allow for coke removal from the catalyst within the reforming zone. In various aspects, one or more types of catalyst regeneration can potentially occur during the regeneration step. One type of catalyst regeneration can correspond to removal of coke from the catalyst. During reforming, a portion of the hydrocarbons introduced into the reforming zone can form coke instead of forming CO or $CO_2$. This coke can potentially block access to the catalytic sites (such as metal sites) of the catalyst. In some aspects, the rate of formation can be increased in portions of the reforming zone that are exposed to higher temperatures, such as portions of the reforming zone that are exposed to temperatures of 800° C. or more, or 900° C. or more, or 1000° C. or more. During a regeneration step, oxygen can be present as the temperature of the reforming zone is increased. At the temperatures achieved during regeneration, at least a portion of the coke generated during reforming can be removed as CO or $CO_2$.

Due to the variation in temperature across the reactor, several options can be used for characterizing the temperature within the reactor and/or within the reforming zone of the reactor. One option for characterizing the temperature can be based on an average bed or average monolith temperature within the reforming zone. In practical settings, determining a temperature within a reactor requires the presence of a measurement device, such as a thermocouple. Rather than attempting to measure temperatures within the reforming zone, an average (bed or monolith) temperature within the reforming zone can be defined based on an average of the temperature at the beginning of the reforming zone and a temperature at the end of the reforming zone. Another option can be to characterize the peak temperature within the reforming zone after a regeneration step in the reaction cycle. Generally, the peak temperature can occur at or near the end of the reforming zone, and may be dependent on the location where combustion is initiated in the reactor. Still another option can be to characterize the difference in temperature at a given location within the reaction zone at different times within a reaction cycle. For example, a temperature difference can be determined between the temperature at the end of the regeneration step and the temperature at the end of the reforming step. Such a temperature difference can be characterized at the location of peak temperature within the reactor, at the entrance to the reforming zone, at the exit from the reforming zone, or at any other convenient location.

In various aspects, the reaction conditions for reforming hydrocarbons can include one or more of an average reforming zone temperature ranging from 400° C. to 1200° (or more); a peak temperature within the reforming zone of 800° C. to 1500° C.; a temperature difference at the location of peak temperature between the end of a regeneration step and the end of the subsequent reforming step of 25° C. or more, or 50° C. or more, or 100° C. or more, or 200° C. or more, such as up to 800° C. or possibly still higher; a temperature difference at the entrance to the reforming zone between the end of a regeneration step and the end of the subsequent reforming step of 25° C. or more, or 50° C. or more, or 100° C. or more, or 200° C. or more, such as up to 800° C. or possibly still higher; and/or a temperature difference at the exit from the reforming zone between the end of a regeneration step and the end of the subsequent reforming step of 25° C. or more, or 50° C. or more, or 100° C. or more, or 200° C. or more, such as up to 800° C. or possibly still higher. For example, the temperature difference between the end of the regeneration step and the end of the reforming step at the location of peak temperature and/or at the entrance to the reforming zone can be 80° C. to 220° C., or 80° C. to 160° C., or 100° C. to 220° C., or 100° C. to 160° C., or 120° C. to 220° C., or 120° C. to 160° C.

With regard to the average reforming zone temperature, in various aspects the average temperature for the reforming zone can be 500° C. to 1500° C., or 400° C. to 1200° C., or 800° C. to 1200° C., or 400° C. to 900° C., or 600° C. to 1100° C., or 500° C. to 1000° C. Additionally or alternately, with regard to the peak temperature for the reforming zone (likely corresponding to a location in the reforming zone close to the location for combustion of regeneration reactants), the peak temperature can be 800° C. to 1500° C., or 1000° C. to 1400° C., or 1200° C. to 1500° C., or 1200° C. to 1400° C.

Additionally or alternately, the reaction conditions for reforming hydrocarbons can include a pressure of 0 psig to 1500 psig (10.3 MPa), or 0 psig to 1000 psig (6.9 MPa), or 0 psig to 550 psig (3.8 MPa); and a gas hourly space velocity of reforming reactants of 1000 $hr^{-1}$ to 50,000 $hr^{-1}$. The space velocity corresponds to the volume of reactants relative to the volume of monolith per unit time. The volume of the monolith is defined as the volume of the monolith as if it was a solid cylinder.

It is noted that the partial oxidation portion of the reaction occurs primarily outside of the reforming zone, in the mixing zone and/or the recuperation zone of the reactor system. In various aspects, the peak temperature in the recuperation zone may occur at or near the end of the reforming step. This is in contrast to the reforming zone, where the peak temperature will occur at or near the end of the regeneration step. For the recuperation zone, the peak temperature can be 700° C. to 1600° C., or 700° C. to 1400° C., or 700° C. to 1200° C., or 850° C. to 1600° C., or 1000° C. to 1600° C., or 1000° C. to 1400° C., or 1200° C. to 1400° C., or 1200° C. to 1600° C.

Monolith Structure(s) for Supporting Catalyst System

One of the purposes of using a monolith or another supporting structure within a reforming environment is to increase the available surface area for holding a deposited catalyst/catalyst system. To achieve this, some monoliths correspond to a structure with a large plurality of cells or channels that allow gas flow through the monolith. Because each individual cell provides surface area for deposition of catalyst, including a large number of cells or channels per unit area can substantially increase the available surface area for catalyst. Such monoliths can generally be referred to as honeycomb monoliths. It is noted that the terms "cell" and "channel" can be used interchangeably to refer to the passages through a monolith.

In various aspects, a monolith or other structure for providing a surface for the reforming catalyst system may be prepared by manufacturing techniques such as but not limited to conventional ceramic powder manufacturing and processing techniques, e.g., mixing, milling, degassing, kneading, pressing, extruding, casting, drying, calcining, and sintering. The starting materials can correspond to a suitable ceramic powder such as synthetic alumina powder and naturally occurring minerals (e.g. bauxite, bentonite, talc) and an organic binder powder in a suitable volume ratio. Certain process steps may be controlled or adjusted to obtain the desired grain size and porosity range and performance properties, such as by inclusion of various manufacturing, property adjusting, and processing additives and agents as are generally known in the art. For example, the two or more types of oxide powders may be mixed in the presence of an organic binder and one or more appropriate solvents or water for a time sufficient to substantially disperse the powders in each other. As another example, precursors of the oxides present in a monolith may be dissolved in water at a desired ratio, spray dried, and calcined to make a mixed powder. Such precursors include (but are not limited to) chlorides, sulfates, nitrates, and mixtures thereof. The calcined powder can be further mixed in the presence of an organic binder and appropriate solvent(s) to make a mixed "dough". Then, the mixed "dough" of materials can be placed in a kneader to mix all the ingredient and to enhance plasticity of the mixed "dough". The number of kneading times and kneading speed can be adjusted. The kneaded "dough" can be placed in a die or form, extruded, dried or otherwise formed into a desired shape. As a non-limiting example, a screw type extruder can be used, and rotation speed of top and bottom screw can be controlled to form a honeycomb shape. As it produces, a wire cutter attached in the screw type extruder operates to make a desired height of the honeycomb monoliths. The resulting extruded body can then be dried to form a "green body". As a non-limiting example, hot air dryer can be used to slowly remove the residual solvent or water in the extruded body. Yet another non-limiting example, a standalone microwave oven or even a continuous microwave drying oven can be used to form a "green body". Drying in a microwave oven is advantageous since it shortens total drying time and minimizes potential cracking associated with a rather rapid drying process. The resulting "green body" can then be sintered at temperatures in the range of about 1500° C.~1700° C. for at least ten minutes, such as from 10 minutes to 48 hours, or possibly from 10 minutes up to 10 days or still longer. Either a batch furnace or a continuous tunnel kiln can be used to sinter the "green body". During sintering the "green body" shrinks as it densifies and consolidates. The sintering shrinkage is typically about 20~30%.

The sintering operation may be performed in an oxidizing atmosphere, reducing atmosphere, or inert atmosphere, and at ambient pressure or under vacuum. For example, the oxidizing atmosphere could be air or oxygen, the inert atmosphere could be argon, and a reducing atmosphere could be hydrogen, $CO/CO_2$ or $H_2/H_2O$ mixtures. Thereafter, the sintered body is allowed to cool, typically to ambient conditions. The cooling rate may also be controlled to provide a desired set of grain and pore structures and performance properties in the particular component.

It is noted that after the sintering operation, any alumina present in the monolith will be substantially converted to α-alumina. The "alpha" phase of alumina is thermodynamically favored at high temperatures, and the temperatures during sintering are sufficient convert substantially all of any other phases of alumina into the "alpha" phase. This is beneficial from a stability standpoint, as converting the alumina in the monolith to α-alumina means that phase transitions are not occurring during exposure of the monolith to the cyclic reforming conditions, where the presence of alternative phases of alumina might facilitate crack formation and/or propagation.

In some aspects, the monolith material (PQ) can further include an intermediate bond layer. The intermediate bond layer can be applied on monolith surfaces prior to forming a washcoat of active materials (e.g., catalyst). In such aspects, the intermediate bond layer provides a better adherence to the washcoated active material. In such aspects, the intermediate bond layer is a metal oxide, $(M)_xO_y$, wherein (M) is at least one metal selected from the group consisting of Al, Si, Mg, Ca, Sr, Ba, K, Na, Ti, Zr, Hf, V, Nb, Ta, Cr, Mo, W, Mn, Fe, Ni, Co, Y, La, Ce, and mixtures thereof. Aluminum oxide (a.k.a. alumina), $Al_2O_3$, is a preferred metal oxide for the bond layer. As an example of how to form an intermediate bond layer, the selected metal oxide, $(M)_xO_y$, can be dispersed in a solution to form a slurry. The slurry can then be washcoated on the monolith. The monolith washcoated with the selected metal oxide, $(M)_xO_y$, is dried and sintered at temperatures in the range of 1100° C.~1600° C. to make the intermediate bonding layer.

It has been discovered that limiting the maximum porosity in the final sintered body tends to effectively, if not actually, limit interconnectivity of the pore spaces with other pore spaces to an extent that increases or maximizes volumetric heat capacity of the sintered body. The porosity ranges for a monolith or other structure can depend upon the desired final component performance properties, but are within a range defined by one or more of the minimum porosity values and one or more of the maximum porosity values, or any set of values not expressly enumerated between the minimums and maximums. Examples of suitable porosity values are 0 vol % to 20 vol % porosity, or 0 vol % to 15 vol %, or 0 vol % to 10 vol %, or 0 vol % to 5 vol %.

The sintered monolith and/or other formed ceramic structure can have any convenient shape suitable for use as a surface for receiving a catalyst or catalyst system. An example of a monolith can be an extruded honeycomb monolith. Honeycomb monoliths can be extruded structures that comprise many (e.g., a plurality, meaning more than one) small gas flow passages or conduits, arranged in parallel fashion with thin walls in between. A small reactor may include a single monolith, while a larger reactor can include a number of monoliths, while a still larger reactor may be substantially filled with an arrangement of many honeycomb monoliths. Each monolith may be formed by extruding monolith blocks with shaped (e.g., square, trigonal, or hexagonal) cross-section and two- or three-dimensionally stacking such blocks above, behind, and beside each other. Monoliths can be attractive as reactor internal structures because they provide high heat transfer capacity with minimum pressure drop.

In some aspects, density, measured by an Archimedes method well-known to the skilled in the art, can be 3.40 gram/cc or more, or 3.50 gram/cc or more, such as up to 3.95 gram/cc which is theoretical density of alumina, or possibly still higher if it contains heavier metal oxides. In some aspects, porosity can be nearly completely closed within the honeycomb monolith walls with the porosity being 10% or less, or 8.0% or less, such as down to 1.0% or possibly still lower.

In some aspects, honeycomb monoliths can be characterized as having open frontal area (or geometric void volume) between 30% to 70%, or 30% to 60%, or 40% to 70%, or 40% to 60%, or 45% to 55%. Additionally or alternately, a monolith can have a conduit density between 50 to 900 cells per square inch (CPSI), or 50 to 600, or 300 to 900, or 300 to 600, or 350 to 550. This roughly corresponds to 7 to 140 cells per square centimeter, or 45 to 140, or 7 to 95, or 45 to 95, or 55 to 85. In some aspects, this type of cell density roughly corresponds to cells or channels that have a diameter/characteristic cell side length of only a few millimeters, such as on the order of roughly one millimeter. Reactor media components, such as the monoliths or alternative bed media, can provide for channels that include a packing with an average wetted surface area per unit volume that ranges from 50 ft$^{-1}$ to 3000 ft$^{-1}$ (~0.16 km$^{-1}$ to ~10 km$^{-1}$), or from 100 ft$^{-1}$ to 2500 ft$^{-1}$ (~0.32 km$^{-1}$ to ~8.2 km$^{-1}$), or from 200 ft$^{-1}$ to 2000 ft$^{-1}$ (~0.65 km$^{-1}$ to ~6.5 km$^{-1}$), based upon the volume of the first reactor that is used to convey a reactant. These relatively high surface area per unit volume values can aid in achieving a relatively quick change in the temperature through the reactor.

Reactor media components can also provide for channels that include a packing that includes a high volumetric heat transfer coefficient (e.g., 0.02 cal/cm$^3$s° C. or more, or 0.05 cal/cm$^3$s° C. or more, or 0.10 cal/cal/cm$^3$s° C. or more); that have low resistance to flow (low pressure drop); that have an operating temperature range consistent with the highest temperatures encountered during regeneration; that have high resistance to thermal shock; and/or that have high bulk heat capacity (e.g., 0.10 cal/cm$^3$s° C. or more, or 0.20 cal/cm$^3$s° C. or more). As with the high surface area values, these relatively high volumetric heat transfer coefficient values and/or other properties can aid in achieving a relatively quick change in the temperature through the reactor, such as generally illustrated by the relatively steep slopes in the exemplary temperature gradient profile graphs, such as in FIGS. 2(a) and 2(b) of FIG. 2. The cited values are averages based upon the volume of reactor used for conveyance of a reactant.

In various aspects, adequate heat transfer rate can be characterized by a heat transfer parameter, $\Delta$THT, below 500° C., or below 100° C., or below 50° C. The parameter $\Delta$THT, as used herein, is the ratio of the bed-average volumetric heat transfer rate that is needed for recuperation, to the volumetric heat transfer coefficient of the bed, hv. The volumetric heat transfer rate (e.g. cal/cm$^3$ sec) that is sufficient for recuperation can be calculated as the product of the gas flow rate (e.g. g/sec) with the gas heat capacity (e.g. cal/g° C.) and desired end-to-end temperature change (excluding any reaction, e.g. ° C.), and then this quantity can be divided by the volume (e.g. cm$^3$) of the reactor (or portion of a reactor) traversed by the gas. The volumetric heat transfer coefficient of the bed, hv, can typically be calculated as the product of an area-based coefficient (e.g. cal/cm$^2$s° C.) and a specific surface area for heat transfer (av, e.g. cm$^2$/cm$^3$), often referred to as the wetted area of the packing.

Catalysts and Catalyst Systems

In various aspects, catalyst systems are provided for reforming of hydrocarbons, along with methods for using such catalyst systems. The catalyst systems can be deposited or otherwise coated on a surface or structure, such as a monolith, to achieve improved activity and/or structural stability. In this discussion, a catalyst system is defined to include at least one catalyst corresponding to one or more catalytic metals, optionally in the form of a metal oxide, and at least one metal oxide support layer. In some aspects, the catalyst and metal oxide support layer can be coated on the monolith at the same time, such as in the form of a washcoat layer on the support. In such aspects, the catalyst can be intermixed with the metal oxide support layer. Alternatively, the catalyst and metal oxide support layer can be deposited sequentially so that the support layer is deposited first, followed by the catalyst. In some aspects, the metal oxide support layer can correspond to a thermally stable metal oxide support layer, such as a metal oxide support layer that is thermally phase stable at temperatures of 800° C. to 1600° C. Optionally, an intermediate bonding layer can be applied to at least a portion of the monolith or other structure prior to depositing the catalyst system. The catalyst systems can be beneficial for use in cyclical reaction environments, such as reverse flow reactors or other types of reactors that are operated using flows in opposing directions and different times within a reaction cycle. The reaction conditions in cyclical reaction environments can also undergo swings in temperature and/or pressure during a reaction cycle. In still other aspects, a catalyst can be deposited without using a corresponding metal oxide support layer.

In some aspects, the catalyst system can correspond to one or more catalysts in a single zone. In other aspects, the catalyst system can correspond to a plurality of catalyst zones. Optionally in such aspects, at least one catalyst zone can include a catalyst that is different from the catalyst(s) in a second catalyst zone.

In some aspects, the catalyst system can include a thermally stable metal oxide support layer. A thermally stable metal oxide support layer corresponds to a metal oxide that is thermally phase stable with regard to structural phase changes at temperatures between 800° C. to 1600° C. In some aspects, such a thermally stable metal oxide support layer can be formed by coating a surface (such using a washcoat) with a metal oxide powder that has a surface area of 20 m$^2$/g or less. For example, the metal oxide powder used for forming a thermally stable metal oxide coating can have a surface area of 0.5 m$^2$/g to 20 m$^2$/g, or 1.0 m$^2$/g to 20 m$^2$/g, or 5.0 m$^2$/g to 20 m$^2$/g. High temperature reforming refers to reforming that takes place at a reforming temperature of 1000° C. or more, or 1100° C. or more, or 1200° C. or more, such as up to 1500° C. or possibly still higher. In various aspects, a catalyst can be annealed at a temperature of 1000° C. or more, or 1100° C. or more, or 1200° C. or more, or 1300° C. or more, such as up to 1600° C. or possibly still higher. This temperature can be substantially similar to or greater than the peak temperature the catalyst is exposed to during a reforming process cycle. An annealing temperature that is substantially similar to a peak temperature can correspond to an annealing temperature that differs from the peak temperature by 0° C. to 50° C.

As an example of a thermally stable metal oxide support layer, alumina has a variety of phases, including $\alpha$-Al$_2$O$_3$, $\gamma$-Al$_2$O$_3$, and $\theta$-Al$_2$O$_3$. A metal powder of $\alpha$-Al$_2$O$_3$ can typically have a surface area of 20 m$^2$/g or less. By contrast, the $\gamma$-Al$_2$O$_3$ and $\theta$-Al$_2$O$_3$ phases have higher surface areas, and a metal powder for use in a washcoat solution of $\gamma$-Al$_2$O$_3$ and/or $\theta$-Al$_2$O$_3$ will have a surface area of greater than 20 m$^2$/g. It is conventionally believed that phases such as $\theta$-alumina or $\gamma$-alumina are superior as a supporting structure for a deposited catalyst, as the greater surface per gram of $\theta$-alumina or $\gamma$-alumina will allow for availability of more catalyst active sites than $\alpha$-alumina. However, phases such as $\gamma$-Al$_2$O$_3$ and $\theta$-Al$_2$O$_3$ are not thermally phase stable at temperatures of 800° C. to 1600° C. At such high temperatures, phases such as $\gamma$-Al$_2$O$_3$ and $\theta$-Al$_2$O$_3$ will undergo phase transitions to higher stability phases. For example, at elevated temperatures, $\gamma$-Al$_2$O$_3$ will first convert to $\Delta$-Al$_2$O$_3$ at roughly 750° C.; then $\Delta$-Al$_2$O$_3$ will convert to $\theta$-Al$_2$O$_3$ at roughly 950° C.; then $\theta$-Al$_2$O$_3$ will then convert to $\alpha$-Al$_2$O$_3$ with further exposure to elevated temperatures between 1000° C. and 1100° C. Thus, $\alpha$-Al$_2$O$_3$ is the thermally phase stable version of Al$_2$O$_3$ at temperatures of 800° C. to 1600° C.

In various aspects, one option for adding a catalyst system to a monolith can be to coat the monolith with a mixture of a catalyst (optionally in oxide form) and metal oxide support layer. For example, powders of the catalyst oxide and the metal oxide support layer can be used to form a washcoat that is then applied to the monolith (or other structure). This can result in a catalyst system where the catalyst is mixed within/distributed throughout the metal oxide support layer, as opposed to the catalyst being deposited on top of the metal oxide support layer. In other words, at least a portion of the catalyst system can correspond to a mixture of the catalyst and the support layer. In other aspects, any convenient method for depositing or otherwise coating the catalyst system on the monolith or other structure can be used. The weight of the catalyst system on the monolith (or other structure) can correspond to 0.1 wt % to 10 wt % of the total weight of the catalyst system plus monolith, or 0.5 wt % to 10 wt %, or 2.0 wt % to 10 wt %, or 0.1 wt % to 6.0 wt %, or 0.5 wt % to 6.0 wt %, or 2.0 wt % to 6.0 wt %.

A catalyst system can be applied to a monolith or other structure, for example, by applying the catalyst system as a washcoat suspension. To form a washcoat suspension, the catalyst system can be added to water to form an aqueous suspension having 10 wt % to 50 wt % solids. For example, the aqueous suspension can include 10 wt % to 50 wt % solids, or 15 wt % to 40 wt %, or 10 wt % to 30 wt %. Optionally, an acid or a base can be added to the aqueous suspension to reduce or raise, respectively, the pH so as to change the particle size distribution of the alumina catalyst and/or binder particles. For example, acetic acid or another organic acid can be added to achieve a pH of 3 to 4. The suspension can then be ball milled (or processed in another manner) to achieve a desired particle size for the catalyst particles, such as a particle size of 0.5 μm to 5 μm. After milling, the suspension can be stirred until time for use so that the particles are distributed substantially uniformly in the solution.

The washcoat suspension can then be applied to a monolith structure to achieve a desired amount of catalyst (such as nickel or rhodium) on the monolith surface. As an example, in one aspect a washcoat thickness of 10 microns was achieved by forming a washcoat corresponding to 10 wt % of the monolith structure. Any convenient type of monolith structure can be used to provide a substantial surface area for support of the catalyst particles. The washcoat can be applied to the monolith to form cells having inner surfaces coated with the catalyst. One option for applying the washcoat can be to dip or otherwise submerge the monolith in the washcoat suspension.

After clearing the cell channels of excess washcoat, the catalyst system coated on the monolith can be optionally dried. Drying can correspond to heating at 100° C. to 200° C. for 0.5 hours to 24 hours. After any optional drying, calcination can be performed. In some aspects, calcining can correspond to heating at 200° C. to 800° C. for 0.5 hours to 24 hours. In some other aspects, calcining can correspond to heating at 800° C. to 1300° C. for 0.5 hours to 24 hours.

In other aspects, a high temperature calcination step can be used, so that the calcining temperature for the catalyst system coated on the monolith is substantially similar to or greater than the peak temperature the monolith will be exposed to during the cyclic high temperature reforming reaction. For a monolith in a high temperature zone, this can correspond to calcining the catalyst system coated on the monolith at a temperature of 800° C. or more, or 1000° C. or more, or 1200° C. or more, or 1300° C. or more, such as up to 1600° C. or possibly still higher. It is noted that if multiple catalyst zones are present, the calcination for monoliths in different catalyst zones can be different.

It has been unexpectedly discovered that performing calcination at a temperature similar to or greater than the peak temperature during the cyclic high temperature reforming process can unexpectedly allow for improved activity for the catalyst system and/or adhesion of the catalyst system to the underlying monolith. Without being bound by any particular theory, it is believed that exposing the monolith and deposited catalyst system to elevated temperatures prior to exposure of the catalyst to a cyclic reaction environment can facilitate forming a stable interface between the catalyst system and the monolith. This stable interface can then have improved resistance to the high temperature oxidizing and/or reducing environment during the reforming process, resulting in improved stability for maintaining the catalyst system on the surface of the monolith.

One of the distinctions between using a catalyst system including a thermally stable metal oxide and a catalyst system that does not use a thermally stable oxide is that the catalyst system including the thermally stable metal oxide can have improved adhesion to the underlying support structure after exposure to the cyclic high temperature reforming environment.

Adhesion of the washcoat after operation can be quantified by the amount of force needed to de-adhere the washcoat. In prior operation, washcoats comprised of theta and gamma alumina were de-adhered with minimal force, such as an amount of force similar to a paint brush stroke (weak). In operation with the phase stable supports, the force needed to de-adhere the washcoat was high, similar to the scraping of dried epoxy off of a glass surface (strong). Due to these differences, only small amounts of washcoat could be de-adhered from the phase stable materials, whereas large amounts of washcoat could be de-adhered from the gamma and theta supports.

Other methods for evaluating adhesion of the washcoat include, but are not limited to, (i) a thermal cycling method, (ii) a mechanical attrition method, and (iii) an air-knife method. As a non-limiting example, the thermal cycling method can be performed by heating the washcoated materials to high temperatures in the range of 800 to 1300° C., cooling the heated substrates to ambient temperature, and repeating such a cycle at least five times. As another non-limiting example, the mechanical attrition method can be performed by placing the washcoated materials inside a plastic container and shaking the container on a vibration table for at least 30 minutes.

In various aspects, suitable catalytic metals can include, but are not limited to, Ni, Co, Fe, Pd, Rh, Ru, Pt, Ir, Cu, Ag, Au, Zr, Cr, Ti, V, Mo, Nb, and combinations thereof. The catalytic metal can be selected based on the desired type of catalytic activity. Such catalytic metals may be used in a catalyst in the form of a metal oxide. In some aspects, for reforming of hydrocarbons in the presence of $H_2O$ and/or $CO_2$ to make hydrogen, Ni, Rh, Ru, Pd, Pt, Ir, Cu, Co, or a combination of thereof can be suitable catalytic metals. The weight of catalytic metal oxide in the catalyst system can range from 0.1 wt % to 70 wt %, or 1.0 wt % to 60 wt %, or 2.0 wt % to 50 wt %, relative to the total weight of the catalyst system. In some aspects where the catalytic metal corresponds to a precious metal or noble metal, the weight of catalytic metal oxide in the catalyst system can range from 0.1 wt % to 10 wt %, or 0.2 wt % to 7.0 wt %, or 0.5 wt % to 4 wt %.

The catalytic metals can be selected to provide long term stable performance at specific temperature zones of the catalytic bed. This can allow for steady methane conversion, phase stability with the metal oxide support, and reduced or minimized sintering of catalytic metals. As an example involving three catalyst zones, the catalyst system in a highest temperature catalytic zone (e.g. 800~1250° C.), which is exposed to some of highest temperatures and most severe temperature swings, can be composed of Ni as a catalytic metal (NiO as a catalytic metal oxide) and $Al_2O_3$ as a metal oxide support. It is noted that this catalyst system can at least partially convert to $NiAl_2O_4$ during portions of the cyclic reforming process. This catalyst system can be formed, for example, by using a mixture of NiO and $Al_2O_3$, as a washcoat on $\alpha$-$Al_2O_3$ monoliths. In such an example, a catalyst system in a medium temperature catalytic zone (e.g. 600~1150° C.) can be composed of Ni and Rh as catalytic metals (NiO and $Rh_2O_3$ as catalytic metal oxide), and $Al_2O_3$ as a metal oxide support. To form this catalyst system, a mixture of NiO and $Rh_2O_3$, as the catalytic material and $Al_2O_3$ (optionally but preferably $\alpha$-$Al_2O_3$) as a metal oxide support material can be washcoated on a monolith comprising of 95 wt % $\alpha$-$Al_2O_3$, 4 wt % $SiO_2$ and 1 wt % $TiO_2$. In such an example, a catalyst system in a low temperature catalytic zone (e.g. 400~1050° C.) can be composed of Rh as catalytic metal ($Rh_2O_3$ as catalytic metal oxide) and $\alpha$-$Al_2O_3$ as a metal oxide support. To form this catalyst system, a mixture of $Rh_2O_3$ and $\alpha$-$Al_2O_3$ as the catalytic material can be washcoated on a monolith comprising 93 wt % $\alpha$-$Al_2O_3$, 5 wt % $SiO_2$ and 2 wt % MgO.

In various aspects, suitable metals for the metal oxide support layer in the catalyst system can include, but are not limited to, Al, Si, Mg, Ca, Sr, Ba, K, Na, Ti, Zr, Hf, V, Nb, Ta, Cr, Mo, W, Mn, Fe, Ni, Co, Y, La, Ce, and combinations thereof. The metal (or metals) for the metal oxide support can be selected so that the metal oxide support substantially does not convert to metallic form under the reducing conditions present in the cyclic reaction environment. As an example, when the catalytic metal oxide is NiO, one option for a metal oxide support is $Al_2O_3$, preferably $\alpha$-$Al_2O_3$. Another example of a suitable metal oxide support, optionally, in combination with NiO as the catalytic metal oxide, is a mixture of $Al_2O_3$ with $SiO_2$, MgO and/or $TiO_2$. In such an example, $SiO_2$ can combine with $Al_2O_3$ to form a mullite phase that could increase resistance to thermal shock and/or mechanical failure. Additionally or alternately, in such an example, MgO and/or $TiO_2$ can be added. The weight of metal oxide support in the catalyst bed can range from 1.0 wt % to 40 wt %, or 2.0 wt % to 30 wt %, or 3.0 wt % to 20 wt %, relative to the total weight of the monolith in the catalyst bed.

In various aspects, a metal oxide support layer (such as a thermally stable metal oxide support layer) can correspond to at least one oxide selected from the corundum group, stabilized zirconia, perovskite, pyrochlore, spinel, hibonite, zeolite, and mixtures thereof. The weight of metal oxide support can range from 1.0 wt % to 40 wt %, or 2.0 wt % to 30 wt %, or 3.0 wt % to 20 wt %, relative to the total weight of the monolith plus catalyst system.

One category of metal oxide support layers can correspond to traditional refractory oxides that are commonly used to form supported catalysts. For example, the metal oxide support can correspond to $\alpha$-$Al_2O_3$, $LaAlO_3$, $LaAl_{11}O_{18}$, MgO, CaO, $ZrO_2$, $TiO_2$, $CeO_2$, $Y_2O_3$, $La_2O_3$, $SiO_2$, $Na_2O$, $K_2O$, and mixtures thereof. This group is defined herein as the "corundum" group of oxides, although many of the oxides in this group do not have the corundum lattice structure. For example, $CeO_2$ and MgO can both have a halite crystal structure. $\alpha$-$Al_2O_3$ consists essentially of a dense arrangement of oxygen ions in hexagonal closest-packing with $Al^{3+}$ ions in two-thirds of the available octahedral sites. $LaAlO_3$, often abbreviated as LAO, is an optically transparent ceramic oxide with a distorted perovskite structure. $LaAl_{11}O_{18}$ can be formed through the solid state reaction of $LaAlO_3$ and $\alpha$-$Al_2O_3$. Plate-like crystals of $LaAl_{11}O_{18}$ are particularly useful as a metal oxide support since catalytic metals can be trapped between plate-like crystal structures. It suppresses sintering of minute catalytic metals in the active material which is washcoated on the monolith of the catalyst bed. Additional examples of oxides from the corundum group can include, but are not limited to: i) 95 wt % $\alpha$-$Al_2O_3$ and 5 wt % $SiO_2$; ii) 93 wt % $\alpha$-$Al_2O_3$, 5 wt % $SiO_2$ and 2 wt % MgO; iii) 94 wt % $\alpha$-$Al_2O_3$, 4 wt % $SiO_2$, 2 wt % MgO and 1 wt % $Na_2O$; iv) 95 wt % $\alpha$-$Al_2O_3$, 4 wt % SiO2 and 1 wt % $TiO_2$; v) 7 wt % $CeO_2$ and 93 wt % MgO; vi) 5 wt % CaO and 95 wt % $\alpha$-$Al_2O_3$; vii) 5 wt % MgO, 5 wt % $CeO_2$ and 90 wt % $\alpha$-$Al_2O_3$; viii) 20 wt % $ZrO_2$ and 80 wt % $CeO_2$, ix) 5 wt % $CeO_2$, 20 wt % $ZrO_2$ and 75 wt % $\alpha$-$Al_2O_3$, and x) 6 wt % $La_2O_3$ and 94 wt % $\alpha$-$Al_2O_3$, based on the weight of metal oxide support.

As an example, the catalyst system can correspond to a mixture of NiO and $Al_2O_3$. Under the cyclic high temperature reforming conditions, the NiO and the $Al_2O_3$ in the will react to form a mixed phase of NiO, $NiAl_2O_4$, and/or $Al_2O_3$. Additionally, based on cyclic exposure to oxidizing and reducing conditions, the catalyst can be converted from a substantially fully oxidized state, such as a combination of oxides including NiO, $NiAl_2O_4$ and $Al_2O_3$, to various states including at least some Ni metal supported on a surface. In this discussion, a catalyst system that includes both NiO and $Al_2O_3$ is referred to as an $NiAl_2O_4$ catalyst system.

Based on the stoichiometry for combining NiO and $Al_2O_3$ to form $NiAl_2O_4$, a catalyst including a molar ratio of Al to Ni of roughly 2.0 (i.e., a ratio of 2:1) could result in formation of $NiAl_2O_4$ with no remaining excess of NiO or $Al_2O_3$. Thus, one option for forming an $NiAl_2O_4$ catalyst is to combine NiO and $Al_2O_3$ to provide a stoichiometric molar ratio of Al to Ni of roughly 2.0. In some other aspects, an excess of NiO can be included in the catalyst relative to the amount of alumina in the support, so that at least some NiO is present in a fully oxidized state. In such aspects, the molar ratio of Al to Ni in the catalyst can be less than 2.0. For example, the molar ratio of Al to Ni in a $NiO/NiAl_2O_4$ catalyst can be 0.1 to 2.0, or 0.1 to 1.9, or 0.1 to 1.5, or 0.5 to 2.0, or 0.5 to 1.9, or 0.5 to 1.5, or 1.0 to 2.0, or 1.0 to 1.9, or 1.2 to 1.5, or 1.5 to 2.0, or 1.5 to 1.9. In still other aspects, an excess of $Al_2O_3$ can be included in the catalyst relative to the amount of Ni, so that at least some $Al_2O_3$ is present in a fully oxidized state. In such aspects, the molar ratio of Al to Ni in the catalyst can be greater than 2.0. For example, the molar ratio of Al to Ni in a $NiAl_2O_4/Al_2O_3$ catalyst can be 2.0 to 10, or 2.1 to 10, or 2.0 to 5.0, or 2.1 to 5.0, or 2.0 to 4.0, or 2.1 to 4.0.

In various aspects, a $NiAl_2O_4$ catalyst can be incorporated, for example, into a washcoat that is then applied to a surface or structure within a reactor, such as a monolith. By providing NiO and $Al_2O_3$ as a catalyst system that is then deposited on a separate monolith (which can then form $NiAl_2O_4$ under the cyclic conditions), the activity of the catalyst can be maintained for unexpectedly longer times relative to using a monolith that directly incorporates NiO and $Al_2O_3$ into the monolith structure.

When a composition is formed that includes both nickel oxide and alumina, the NiO and $Al_2O_3$ can react to form a compound corresponding to $NiAl_2O_4$. However, when NiO (optionally in the form of $NiAl_2O_4$) is exposed to reducing conditions, the divalent Ni can be reduced to form metallic Ni. Thus, under cyclic reforming conditions that include both high temperature oxidizing and reforming environments, at least a portion of $NiAl_2O_4$ catalyst can undergo cyclic transitions between states corresponding to Ni metal and $Al_2O_3$ and $NiAl_2O_4$. It is believed that this cyclic transition between states can allow a $NiAl_2O_4$ catalyst to provide unexpectedly improved activity over extended periods of time. Without being bound by any particular theory, it is believed that at least part of this improved activity for extended time periods is due to the ability of Ni to "redisperse" during the successive oxidation cycles. It is believed this re-dispersion occurs in part due to the formation of $NiAl_2O_4$ from NiO and $Al_2O_3$. Catalyst sintering is a phenomenon known for many types of catalysts where exposure to reducing conditions at elevated temperature can cause catalyst to agglomerate on a surface. Thus, even if the surface area of the underlying surface remains high, the agglomeration of the catalyst may reduce the amount of available catalyst active sites, as the catalyst sinters and forms lower surface area deposits on the underlying surface. By contrast, it is believed that the cyclic transition between states can allow the Ni in an $NiAl_2O_4$ catalyst system to retain good dispersion, so that catalyst activity can be maintained. It is believed that further advantage can be obtained by using a sufficient amount of excess oxygen during the regeneration step so that all available Ni is oxidized back to NiO and/or $NiAl_2O_4$.

It is noted that by supplying both NiO as a catalyst and $Al_2O_3$ as a metal oxide support layer as part of the catalyst system, the alumina for forming $NiAl_2O_4$ is already provided as part of the catalyst system. It is believed that this reduces or minimizes interaction of Ni with any alumina that may be present in the monolith composition, and therefore reduces or minimizes degradation of the underlying monolith when exposed to successive cycles of high temperature oxidation and reduction.

NiO supported on yttria-stabilized zirconia (NiO/YSZ) is another example of an Ni-containing catalyst system that can be used for reforming. Although $\alpha$-$Al_2O_3$ is phase stable, it is able to react with NiO at high temperature to form $NiAl_2O_4$. It is believed, however, that YSZ does not react with Ni (NiO) at high temperatures. Thus, it is believed that in the NiO/YSZ system, a cyclic oxidation and reduction of Ni to NiO and back to Ni metal does occur, but redispersion does not occur. However, NiO/YSZ can still provide stable reforming activity in a cyclic high temperature reforming environment. In some aspects, to assist with bonding of NiO/YSZ to a monolith, an intermediate oxide layer of $\alpha$-$Al_2O_3$ can first be deposited as a washcoat on the monolith. The NiO/YSZ layer can then be deposited on the intermediate oxide layer.

NiO/YSZ represents an alternative type of catalyst system, as YSZ is a phase stable support that does not react with Ni to form a different material. In order to determine stability of the support oxide layer, a first sample of NiO/YSZ was exposed to calcining at 1300° C., while a second sample was steamed in air at 1000° C. X-ray diffraction was used to verify that no phase changes occurred. However, based on Brunauer-Emmett-Teller (BET) surface area analysis, it was observed that the surface area of the NiO/YSZ sample was roughly 53 m²/g prior to the calcining and steaming, and roughly 5 m²/g after the calcining and steaming.

Still another example of a catalyst system containing Ni can be NiO on a perovskite oxide, such as $Sr_{0.65}La_{0.35}TiO_3$ (SLT).

EXAMPLES

A process model was used to compare four different reaction system configurations for production of hydrogen. The goal for each reaction system configuration was to produce a hydrogen stream for use as an input to an ammonia synthesis process. The process model used representative natural gas streams as the hydrocarbon for reforming. (For Process 3 below, a different natural gas composition was used to allow for use of published values for the conventional configuration.) It is noted that several of the process configurations involve use of an air separation unit. Since the goal is to make hydrogen for use in ammonia synthesis, the nitrogen side product from the air separation unit can be used as the $N_2$ source for the ammonia synthesis. The process model allowed for generation of values so that a direct comparison could be made between the thermal efficiencies of different configurations for hydrogen generation as an input to ammonia synthesis. In this discussion, thermal efficiency was calculated based on the lower heating values (LHV) of the ammonia ($NH_3$) product and the natural gas (NG) feed according to Equation (6).

$$LHV(NH_3 \text{ Product})/[LHV(NG \text{ Feed})+<\text{Electricity Required}>/0.55] \tag{6}$$

Process 1: In one process, the modeled reaction system included a reverse flow reactor operated with a reforming step (no supplemental partial oxidation) and a regeneration step. In order to facilitate carbon capture, the regeneration step is performing using $O_2$ from an air separation unit as the source of oxygen. Recycled $CO_2$ is added to the $O_2$ to provide improved heat transfer within the reactor system during the regeneration step. Because only reforming is performed during the reforming step, all of the heat for the reforming step is provided during the regeneration step.

The hydrocarbon conversion for the reforming process is driven to roughly 90% based on selection of process conditions. Hydrogen product is maximized by performing Water Gas Shift on the syngas product. To achieve sufficient $H_2$ purity for use in an ammonia synthesis process, the $H_2$ is separated from the reforming effluent using a pressure swing adsorption (PSA) process. Use of PSA is driven in part by the need to separate the $H_2$ from the remaining unreacted hydrocarbons in the reforming unit.

Process 2: In a second process, the modeled reaction system included a reverse flow reactor operated with a reaction step and a regeneration step. The reaction step included both reforming and partial oxidation, in order to enable conversion of 99 wt % of the hydrocarbons in the natural gas feed. In order to facilitate carbon capture, the regeneration step is performing using $O_2$ from an air separation unit as the source of oxygen. Recycled $CO_2$ is added to the $O_2$ to provide improved heat transfer within the reactor system during the regeneration step. However, the use of partial oxidation results in several modifications of the process. First, the reforming zone is operated at a lower temperature, and only roughly 80 wt % of the hydrocarbons are converted by reforming. This reduces the net amount of heat that is needed to operate the reforming step. Second, the partial oxidation reaction adds heat to the recuperation zone during the reforming step. By providing a portion of the net heat for reforming via the partial oxidation, the amount of heat added to the reactor during the regeneration step is further reduced. As a result, the amount of $O_2$ from an air separation unit can be substantially reduced.

For the partial oxidation process, because the goal is to form a feed for ammonia production, air can be used as the oxidant. Any nitrogen present in the reforming effluent can be included as part of the $N_2$ input for the ammonia synthesis process.

Because the combination of reforming plus partial oxidation can achieve 99 wt % or higher conversion of hydrocarbons in the feed to the reaction step, the remaining hydrocarbons in the reforming effluent can be removed by the conventional methanation step used at the front end of typical ammonia synthesis processes. As a result, an amine-based separation followed by a liquid nitrogen wash can be used to remove carbon oxides from the reforming effluent prior to use of the reforming effluent for use as an input to ammonia synthesis. The purge from the liquid nitrogen wash step contains less methane due to the 99+ wt % hydrocarbon conversion, reducing the furnace capacity and heat loss from the system. In addition to reducing energy costs, this also reduces or minimizes the amount of $H_2$ that is lost during the separation process.

Because of the process modifications that are enabled by performing both reforming and partial oxidation during the reaction step, the thermal efficiency of the $H_2$ generation process can be substantially improved.

Process 3: A third process was modeled that corresponds to a conventional configuration for producing hydrogen for use in an ammonia synthesis process. In a conventional process flow, a sequence of reforming steps is used to produce the $H_2$, corresponding to steam methane reforming followed by air-blown autothermal reforming followed by gas-heated reforming. Conventional processing steps are then used to prepare the reforming output for use as an input flow to ammonia synthesis.

Process 4: The four process that was modeled corresponded to using an autothermal reformer to make $H_2$ while using $O_2$ from an air separation unit as the $O_2$ source. This is a configuration suitable for making "blue" hydrogen using an autothermal reformer.

Table 1 shows details from the process model and the resulting outputs. In Table 1, "TPD" refers to "tons per day". Thermal efficiency is calculated according to Equation (6). It is noted that the $CO_2$ direct capture percentage is calculated as %(direct capture)=$[1-CO_2(\text{emitted})/CO_2(\text{captured})]\times100$.

production. This is due in part to the advantages of performing direct heating of the reaction environment in an RFR process. Additionally, by performing both reforming and partial oxidation during the reaction step, Process 2 provided a still further substantial increase in thermal efficiency relative to an RFR process that performed only reforming (Process 1). This additional increase in thermal efficiency is due in part to reduced fuel consumption during the regeneration step, and due in part to the improved thermal efficiency of avoiding the subsequent PSA process when preparing the reforming effluent for use in ammonia synthesis. As shown, all of the processes shown in Table 1 provide a high degree of carbon capture for the $H_2$ production process.

Additional Embodiments

Embodiment 1. A method for converting hydrocarbons in a cyclic flow reaction system, comprising: mixing a fuel flow and a first $O_2$-containing flow in a mixing zone of a reactor system to form a mixture comprising an $O_2$ content of 0.1 vol % or more, the reactor system comprising a reforming zone, a mixing zone adjacent to the reforming zone, and a recuperation zone adjacent to an opposing side of the mixing zone; reacting the mixture to heat one or more surfaces in the reforming zone to a reforming temperature, at least a portion of the reforming zone comprising a reforming catalyst; exposing a reactant stream comprising one or more hydrocarbons to the reforming catalyst in the reforming zone under reforming conditions to form a reforming effluent, a direction of flow of the reactant stream being reversed relative to a direction of flow for the mixture; mixing at least a portion of the reforming effluent with a second $O_2$-containing stream in the mixing zone; and expos

TABLE 1

| Comparison of Processes for Generating $H_2$ | | | | | |
| --- | --- | --- | --- | --- | --- |
| | | Process 1 (RFR Conv = 90 wt %) | Process 2 (RFR Conv = 99 wt %) | Process 3 | Process 4 |
| $NH_3$ | TPD | 2615.8 | 2691.0 | 4626.1 | 2925.1 |
| Compression (not including ASU) | MW | 87.1 | 84.1 | 188.3 | 83.2 |
| ASU | MW | 24.6 | 11.3 | 0.0 | 32.2 |
| Power generation | MW | −7.9 | −8.2 | −117.0 | −14.7 |
| Net Power | MW | 103.8 | 87.1 | 71.3 | 100.7 |
| Net Power/MW Ammonia | MW/MW | 0.19 | 0.15 | 0.07 | 0.16 |
| Natural Gas | kmol/hr | 3103.7 | 3058.7 | 7827.9 | 4030.0 |
| Nat Gas LHV | KJ/kmol | 867562 | 867562 | 800422 | 867562 |
| Nat Gas energy | MW | 748.0 | 737.1 | 1740.5 | 971.2 |
| Ammonia LHV | MJ/kg | 18.5 | 18.5 | 18.5 | 18.5 |
| Ammonia product energy content | MW | 559.0 | 575.1 | 988.7 | 625.1 |
| Thermal efficiency | | 59.7% | 64.2% | 52.9% | 54.2% |
| $CO_2$ captured | kmol/hr | 3390.4 | 3130.0 | 6927.0 | |
| $CO_2$ emission | kmol/hr | 12.3 | 113.0 | 148.0 | |
| $CO_2$ direct capture % | % | 99.6% | 96.5% | 97.9% | |

In Table 1, the amount of ammonia generated by each process varies, based on selection of standard commercial scale units for use in the process model. However, the thermal efficiencies of the processes can be directly compared. As shown in Table 1, the reverse flow reactor configurations provide a substantial improvement in thermal efficiency relative to conventional configurations for $H_2$ ing the mixture of the at least a portion of the reforming effluent and the second $O_2$-containing stream to partial oxidation conditions in the recuperation zone to form a partial oxidation effluent, the partial oxidation effluent comprising 2.0 vol % or less of hydrocarbons, the partial oxidation effluent optionally comprising a molar ratio of $H_2$ to CO of 2.2 or more.

Embodiment 2. The method of Embodiment 1, wherein the reforming conditions comprise a peak temperature in the reforming zone of 1000° C. or less.

Embodiment 3. The method of any of the above embodiments, wherein a peak temperature in the reforming zone during the reacting the mixture is lower than a peak temperature in the recuperation zone during the exposing the mixture of the at least a portion of the reforming effluent and the second $O_2$-containing stream to partial oxidation conditions.

Embodiment 4. The method of any of the above embodiments, wherein a peak temperature in the recuperation zone during the exposing the mixture of the at least a portion of the reforming effluent and the second $O_2$-containing stream to partial oxidation conditions is 1200° C. or more.

Embodiment 5. The method of any of the above embodiments, wherein the reforming zone comprises a heat sink, the heat sink comprising an average heat sink reforming catalyst density that is 10% or less of an average catalyst density for the reforming zone.

Embodiment 6. The method of any of the above embodiments, wherein an $O_2$ content of the second $O_2$-containing stream is 5.0% to 30% of a stoichiometric need for combustion of the one or more hydrocarbons in the reactant stream.

Embodiment 7. The method of any of the above embodiments, i) wherein the second $O_2$-containing stream comprises air; or ii) wherein the second $O_2$-containing stream comprises 50 vol % or more combined of $CO_2$ and $O_2$, or wherein the second $O_2$-containing stream comprises 25 vol % or less of $N_2$, or a combination thereof.

Embodiment 8. The method of any of the above embodiments, a) wherein the reforming conditions comprise conversion of 85 wt % or less of the one or more hydrocarbons; b) wherein a combined conversion of the one or more hydrocarbons during the exposing the reactant stream and during the exposing the mixture is 98 wt % or more; or c) a combination of a) and b).

Embodiment 9. The method of any of the above embodiments, wherein the second $O_2$-containing stream enters the reactor system in the mixing zone.

Embodiment 10. The method of any of the above embodiments, wherein a hydrocarbon content of the fuel flow at an end of the reacting is greater than a hydrocarbon content of the fuel flow at a beginning of the reacting.

Embodiment 11. A reverse flow reactor system, comprising: a reaction zone comprising a reforming catalyst and a heat sink, the reaction zone comprising an average reforming catalyst density, the reaction zone further comprising a reactant inlet and a flue gas outlet; a mixing zone adjacent to the reaction zone, the reaction zone comprising at least one reaction zone flow path providing fluid communication between the reactant inlet and the mixing zone; and a recuperation zone adjacent to the mixing zone, the mixing zone providing fluid communication between the reaction zone and the recuperation zone, the recuperation zone comprising a fuel inlet, an oxidant inlet, and a reaction effluent outlet, the recuperation zone comprising at least one recuperation zone flow path providing fluid communication between the fuel inlet and the mixing zone, the recuperation zone further comprising one or more channels for providing fluid communication between the oxidant inlet and the mixing zone that are separate from the at least one flow path, the reactor system comprising a second oxidant inlet and at least one additional flow path providing fluid communication between the second oxidant inlet and the mixing zone,
the at least one additional flow path being separate from the at least one reaction zone flow path.

Embodiment 12. The system of Embodiment 11, wherein the heat sink comprises a heat sink average reforming catalyst density that is 10% or less of the average catalyst density.

Embodiment 13. The system of Embodiment 11 or 12, wherein the mixing zone comprises the second oxidant inlet; or wherein the mixing zone comprises one or more mixing structures; or a combination thereof.

Embodiment 14. The system of any of Embodiments 11-13, wherein the recuperation zone comprises one or more monoliths, the one or more monoliths comprising channels that monotonically increase in cross-sectional area from the end of the regeneration zone at the end of the reaction system to the interface of the regeneration zone with the mixing zone.

Embodiment 15. A partial oxidation effluent formed according to the method of any of Embodiments 1-10.

Additional Embodiment A. The method of any of Embodiments 1-10, wherein the recuperation zone comprises one or more monoliths, the one or more monoliths comprising channels that monotonically increase in size from the end of the regeneration zone at the end of the reaction system to the interface of the regeneration zone with the mixing zone.

Additional Embodiment B. The system of any of Embodiments 11-14, wherein the recuperation zone comprises one or more monoliths, an open frontal area of the one or more monoliths varying within the recuperation zone.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

The invention claimed is:

1. A method for converting hydrocarbons in a cyclic flow reaction system, comprising:

mixing a fuel flow and a first $O_2$-containing flow in a mixing zone of a reactor system to form a mixture comprising an $O_2$ content of 0.1 vol % or more, the reactor system comprising a reforming zone, a mixing zone adjacent to the reforming zone, and a recuperation zone adjacent to an opposing side of the mixing zone;

reacting the mixture to heat one or more surfaces in the reforming zone to a reforming temperature, at least a portion of the reforming zone comprising a reforming catalyst;

exposing a reactant stream comprising one or more hydrocarbons to the reforming catalyst in the reforming zone under reforming conditions to form a reforming effluent, a direction of flow of the reactant stream being reversed relative to a direction of flow for the mixture;

mixing at least a portion of the reforming effluent with a second $O_2$-containing stream in the mixing zone; and exposing the mixture of the at least a portion of the reforming effluent and the second $O_2$-containing stream to partial oxidation conditions in the recuperation zone to form a partial oxidation effluent, the partial oxidation effluent comprising 2.0 vol % or less of hydrocarbons.

2. The method of claim 1, wherein the reforming conditions comprise a peak temperature in the reforming zone of 1000° C. or less.

3. The method of claim 1, wherein a peak temperature in the reforming zone during the reacting the mixture is lower than a peak temperature in the recuperation zone during the exposing the mixture of the at least a portion of the reforming effluent and the second $O_2$-containing stream to partial oxidation conditions.

4. The method of claim 1, wherein a peak temperature in the recuperation zone during the exposing the mixture of the at least a portion of the reforming effluent and the second $O_2$-containing stream to partial oxidation conditions is 1200° C. or more.

5. The method of claim 1, wherein the reforming zone comprises a heat sink, the heat sink comprising an average heat sink reforming catalyst density that is 10% or less of an average catalyst density for the reforming zone.

6. The method of claim 1, wherein an $O_2$ content of the second $O_2$-containing stream is 5.0% to 30% of a stoichiometric need for combustion of the one or more hydrocarbons in the reactant stream.

7. The method of claim 1, wherein the second $O_2$-containing stream comprises air.

8. The method of claim 1, wherein the second $O_2$-containing stream comprises 50 vol % or more combined of $CO_2$ and $O_2$, or wherein the second $O_2$-containing stream comprises 25 vol % or less of $N_2$, or a combination thereof.

9. The method of claim 1, wherein a combined conversion of the one or more hydrocarbons during the exposing the reactant stream and during the exposing the mixture is 98 wt % or more.

10. The method of claim 1, wherein the second $O_2$-containing stream enters the reactor system in the mixing zone.

11. The method of claim 1, wherein a hydrocarbon content of the fuel flow at an end of the reacting is greater than a hydrocarbon content of the fuel flow at a beginning of the reacting.

12. The method of claim 1, wherein the reforming conditions comprise conversion of 85 wt % or less of the one or more hydrocarbons.

13. The method of claim 1, wherein the partial oxidation effluent comprises a molar ratio of $H_2$ to CO of 2.2 or more.

14. The method of claim 1, wherein the recuperation zone comprises one or more monoliths, the one or more monoliths comprising channels that monotonically increase in size from the end of the regeneration zone at the end of the reaction system to the interface of the regeneration zone with the mixing zone.

15. A reverse flow reactor system, comprising:

a reaction zone comprising a reforming catalyst and a heat sink, the reaction zone comprising an average reforming catalyst density, the reaction zone further comprising a reactant inlet and a flue gas outlet;

a mixing zone adjacent to the reaction zone, the reaction zone comprising at least one reaction zone flow path providing fluid communication between the reactant inlet and the mixing zone; and a recuperation zone adjacent to the mixing zone, the mixing zone providing fluid communication between the reaction zone and the recuperation zone, the recuperation zone comprising a fuel inlet, an oxidant inlet, and a reaction effluent outlet, the recuperation zone comprising at least one recuperation zone flow path providing fluid communication between the fuel inlet and the mixing zone, the recuperation zone further comprising one or more channels for providing fluid communication between the oxidant inlet and the mixing zone that are separate from the at least one flow path, the reactor system comprising a second oxidant inlet and at least one additional flow path providing fluid communication between the second oxidant inlet and the mixing zone, the at least one additional flow path being separate from the at least one reaction zone flow path.

16. The system of claim 15, wherein the heat sink comprises a heat sink average reforming catalyst density that is 10% or less of the average catalyst density.

17. The system of claim 15, wherein the mixing zone comprises the second oxidant inlet.

18. The system of claim 15, wherein the recuperation zone comprises one or more monoliths, an open frontal area of the one or more monoliths varying within the recuperation zone.

19. The system of claim 15, wherein the recuperation zone comprises one or more monoliths, the one or more monoliths comprising channels that monotonically increase in cross-sectional area from the end of the regeneration zone at the end of the reaction system to the interface of the regeneration zone with the mixing zone.

20. The system of claim 15, wherein the mixing zone comprises one or more mixing structures.

* * * * *